(12) United States Patent
Kato et al.

(10) Patent No.: US 12,165,430 B2
(45) Date of Patent: Dec. 10, 2024

(54) DETECTION DEVICE

(71) Applicant: Japan Display Inc., Tokyo (JP)

(72) Inventors: Hirofumi Kato, Tokyo (JP); Yoshitaka Kojima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/378,501

(22) Filed: Oct. 10, 2023

(65) Prior Publication Data

US 2024/0046694 A1 Feb. 8, 2024

Related U.S. Application Data

(63) Continuation of application No. PCT/JP2022/017851, filed on Apr. 14, 2022.

(30) Foreign Application Priority Data

Apr. 14, 2021 (JP) .................. 2021-068636

(51) Int. Cl.
*G06V 40/13* (2022.01)
*G06V 40/145* (2022.01)

(52) U.S. Cl.
CPC ........ *G06V 40/1318* (2022.01); *G06V 40/145* (2022.01)

(58) Field of Classification Search
CPC ............. G06V 40/1318; G06V 40/145; G06V 40/1341; G06V 40/14; G06V 40/15
See application file for complete search history.

(56) References Cited

U.S. PATENT DOCUMENTS 6,219,454 B1 *  4/2001  Kawano .................. G06T 9/001
                                                        382/312
2009/0027358 A1    1/2009  Hosono
(Continued)

FOREIGN PATENT DOCUMENTS

JP  H-09282407 A  * 10/1997  ......... G06V 40/1318
JP  2003346135 A  * 12/2003  ......... G06V 40/1318
(Continued)

OTHER PUBLICATIONS

International Search Report issued in International Patent Application No. PCT/JP2022/017851 on Jun. 28, 2022 and English translation of same. 5 pages.
(Continued)

*Primary Examiner* — Yuzhen Shen
(74) *Attorney, Agent, or Firm* — K&L Gates LLP

(57) ABSTRACT

According to an aspect, a detection device includes: a plurality of optical sensors that are arranged in a detection area and each of which is configured to output a signal corresponding to light irradiating the optical sensor; a detection circuit configured to be supplied with the signals from the optical sensors; and a control circuit configured to output first data and second data for which detection conditions for acquiring the signals differ from each other. The control circuit is configured to output detection information data in which the detection conditions for the first data and the detection conditions for the second data are added as attribute information to a head of a data string in which the first data and the second data are sequentially arranged.

16 Claims, 19 Drawing Sheets

(56) References Cited

U.S. PATENT DOCUMENTS

| | | | | |
|---|---|---|---|---|
| 2015/0205984 A1* | 7/2015 | Jiang | ................ | G06K 19/0614 |
| | | | | 235/494 |
| 2015/0227774 A1* | 8/2015 | Balch | ................ | G06V 40/1365 |
| | | | | 382/124 |
| 2018/0012069 A1 | 1/2018 | Chung et al. | | |
| 2019/0065717 A1* | 2/2019 | Won | ................ | G06V 40/1318 |
| 2020/0387591 A1* | 12/2020 | Witchey | ................ | G06F 21/645 |
| 2022/0285461 A1* | 9/2022 | Hatsumi | ................ | H10K 59/40 |
| 2023/0177867 A1* | 6/2023 | Nakata | ................ | G06T 1/00 |
| | | | | 382/124 |

FOREIGN PATENT DOCUMENTS

| | | |
|---|---|---|
| JP | 2006-331239 A | 12/2006 |
| JP | 2009-032005 A | 2/2009 |
| JP | 2020-166058 A | 10/2020 |
| JP | 2021-044454 A | 3/2021 |
| WO | WO2020/213621 A1 | 10/2020 |

OTHER PUBLICATIONS

Written Opinion issued in International Patent Application No. PCT/JP2022/017851 on Jun. 28, 2022. 4 pages.
Office Action issued in related Japanese Patent Application No. 2023-514682, on May 21, 2024 and English translation of same. 7 pages.

* cited by examiner

FIG.17

| DATA POSITION | CATEGORY | bit7 | bit6 | bit5 | bit4 | bit3 | bit2 | bit1 | bit0 | |
|---|---|---|---|---|---|---|---|---|---|---|
| 0 | FPGA HEADER | 1 | 1 | 1 | 1 | 1 | 1 | 1 | 1 | HEADER MARK |
| 1 | | 1 | 1 | 1 | 1 | 1 | 1 | 1 | 1 | |
| 2 | | 1 | 1 | 1 | 1 | 1 | 1 | 1 | 1 | |
| 3 | | 1 | 1 | 1 | 1 | 1 | 1 | 1 | 1 | |
| 4 | | 1 | 0 | Seq12 | Seq11 | Seq10 | Seq9 | Seq8 | Seq7 | Frame NUMBER |
| 5 | | 1 | 0 | Seq6 | Seq5 | Seq4 | Seq3 | Seq2 | Seq1 | |
| 6 | | 1 | 0 | 0 | 0 | 0 | 0 | 0 | 0 | RESERVED AREA |
| 7 | | 1 | 0 | 0 | 0 | 0 | 0 | 0 | 0 | |
| 8 | AFE HEADER | | | | | | | | | AFE HEADER 1 |
| 9 | | | | | | | | | | AFE HEADER 2 |
| 10 | | | | | | | | | | AFE HEADER 3 |
| 11 | | | | | | | | | | AFE HEADER 4 |
| 12 | | | | | | | | | | AFE HEADER 5 |
| 13 | | | | | | | | | | AFE HEADER 6 |
| 14 | | | | | | | | | | AFE HEADER 7 |
| 15 | | | | | | | | | | AFE HEADER 8 |
| 16 | | | | | | | | | | AFE HEADER 9 |
| 17 | | | | | | | | | | AFE HEADER 10 |
| 18 | | | | | | | | | | AFE HEADER 11 |
| 19 | | | | | | | | | | AFE HEADER 12 |
| 20 | | | | | | | | | | AFE HEADER 13 |
| 21 | | | | | | | | | | AFE HEADER 14 |
| 22 | | | | | | | | | | AFE HEADER 15 |
| 23 | | | | | | | | | | AFE HEADER 16 |
| 24 | FRAME DATA | Raw16 | Raw15 | Raw14 | Raw13 | Raw12 | Raw11 | Raw10 | Raw9 | Unit DATA MSB |
| 25 | | Raw8 | Raw7 | Raw6 | Raw5 | Raw4 | Raw3 | Raw2 | Raw1 | Unit DATA LSB |
| 26 | | Raw16 | Raw15 | Raw14 | Raw13 | Raw12 | Raw11 | Raw10 | Raw9 | Unit DATA MSB |
| 27 | | Raw8 | Raw7 | Raw6 | Raw5 | Raw4 | Raw3 | Raw2 | Raw1 | Unit DATA LSB |
| 28 | | Raw16 | Raw15 | Raw14 | Raw13 | Raw12 | Raw11 | Raw10 | Raw9 | Unit DATA MSB |
| 29 | | Raw8 | Raw7 | Raw6 | Raw5 | Raw4 | Raw3 | Raw2 | Raw1 | Unit DATA LSB |
| 30 | | Raw16 | Raw15 | Raw14 | Raw13 | Raw12 | Raw11 | Raw10 | Raw9 | Unit DATA MSB |
| | | | | | | | | | | |
| N-9 | FRAME DATA | Raw16 | Raw15 | Raw14 | Raw13 | Raw12 | Raw11 | Raw10 | Raw9 | Unit DATA MSB |
| N-8 | | Raw8 | Raw7 | Raw6 | Raw5 | Raw4 | Raw3 | Raw2 | Raw1 | Unit DATA LSB |
| N-7 | FPGA FOOTER | 0 | 0 | 0 | 0 | 0 | 0 | 0 | 0 | FOOTER MARK |
| N-6 | | 0 | 0 | 0 | 0 | 0 | 0 | 0 | 0 | |
| N-5 | | 0 | 0 | 0 | 0 | 0 | 0 | 0 | 0 | |
| N-4 | | 0 | 0 | 0 | 0 | 0 | 0 | 0 | 0 | |
| N-3 | | 0 | 0 | Seq12 | Seq11 | Seq10 | Seq9 | Seq8 | Seq7 | Frame NUMBER |
| N-2 | | 0 | 0 | Seq6 | Seq5 | Seq4 | Seq3 | Seq2 | Seq1 | |
| N-1 | | 0 | 0 | 0 | 0 | 0 | 0 | 0 | 0 | RESERVED AREA |
| N | | 0 | 0 | 0 | 0 | 0 | 0 | 0 | 0 | |

DETECTION DEVICE

CROSS-REFERENCE TO RELATED APPLICATION

This application is a continuation of International Patent Application No. PCT/JP2022/017851 filed on Apr. 14, 2022, which application claims the benefit of priority from Japanese Patent Application No. 2021-068636 filed on Apr. 14, 2021, the entire contents of which are incorporated herein by reference.

BACKGROUND

1. Technical Field

What is disclosed herein relates to a detection device.

2. Description of the Related Art

United States Patent Application Publication No. 2018/0012069 (US-A-2018/0012069) describes an optical sensor in which a plurality of photoelectric conversion elements such as photodiodes are arranged on a semiconductor substrate. In the optical sensor, signals output from the photoelectric conversion elements change with an amount of irradiating light, thereby enabling detection of biometric information. The optical sensor of US-A-2018/0012069 can detect asperities on a surface of a finger at a fine pitch and is used as a fingerprint sensor. Japanese Patent Application Laid-open Publication No. 2009-032005 (JP-A-2009-032005) describes a display device including a plurality of sensors that detect infrared rays. The display device of JP-A-2009-032005 can detect the position of a finger, a fingerprint pattern, and a vein pattern based on reflected light of the infrared light.

The optical sensor is required to detect not only a shape of a fingerprint of an object to be detected such as a finger or a palm, but also various types of the biometric information on the object to be detected. For example, a case can be considered where a plurality of types of the biometric information are simultaneously detected under different detection conditions. In that case, each of pieces of simultaneously detected data needs to be associated with the detection conditions under which the piece of data is detected.

For the foregoing reasons, there is a need for a detection device capable of associating data detected under different detection conditions with the detection conditions for the data.

SUMMARY

According to an aspect, a detection device includes: a plurality of optical sensors that are arranged in a detection area and each of which is configured to output a signal corresponding to light irradiating the optical sensor; a detection circuit configured to be supplied with the signals from the optical sensors; and a control circuit configured to output first data and second data for which detection conditions for acquiring the signals differ from each other. The control circuit is configured to output detection information data in which the detection conditions for the first data and the detection conditions for the second data are added as attribute information to a head of a data string in which the first data and the second data are sequentially arranged.

BRIEF DESCRIPTION OF THE DRAWINGS

FIG. 17 is a chart illustrating a detailed specific example of the data format illustrated in FIG. 16;

DETAILED DESCRIPTION

Figure 1:
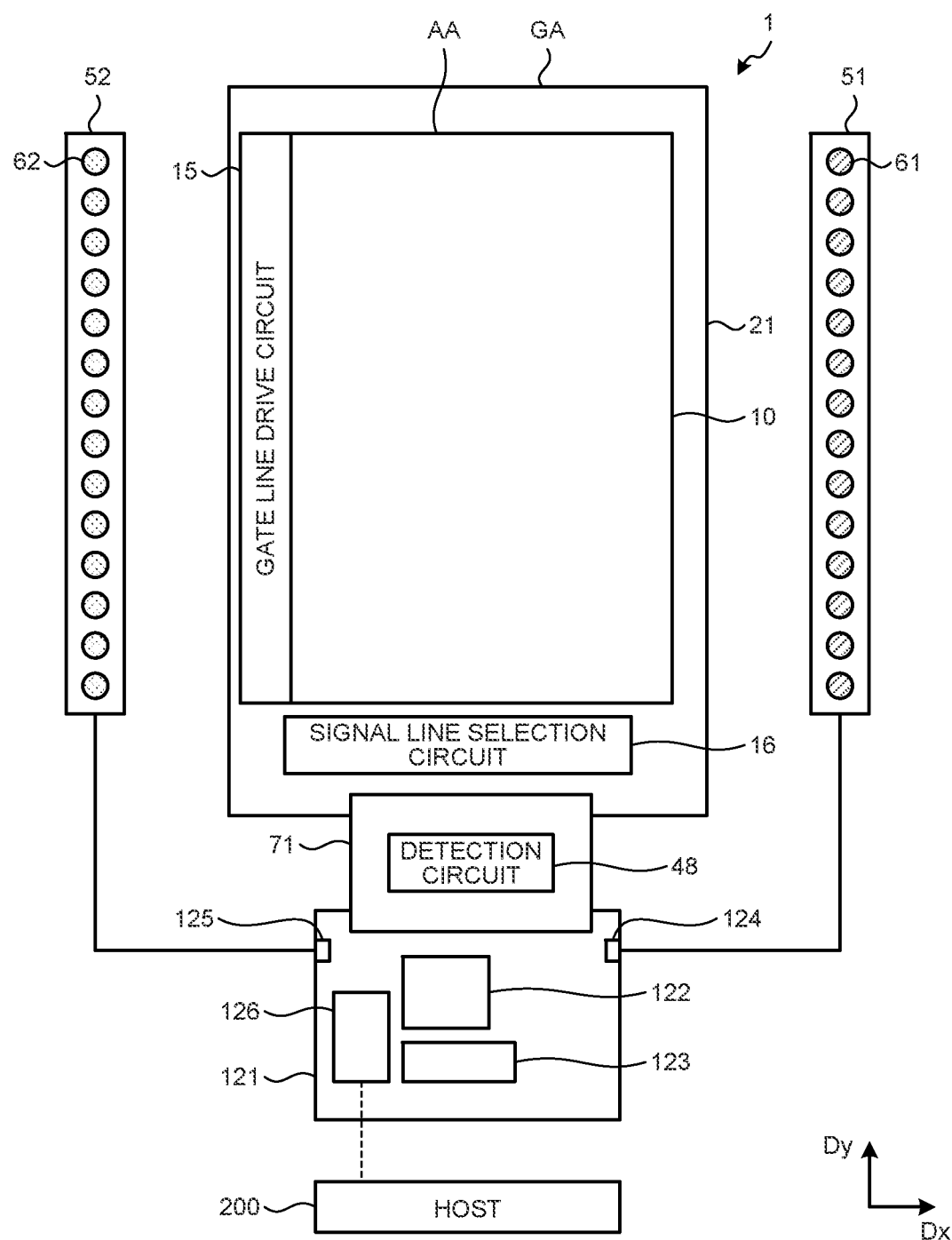
FIG. 1 is a plan view illustrating a detection device according to an embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the description and the drawings, and detailed description thereof may not be repeated where appropriate.

In this disclosure, when an element is described as being "on" another element, the element can be directly on the other element, or there can be one or more elements between the element and the other element.

FIG. 1 is a plan view illustrating a detection device according to an embodiment. As illustrated in FIG. 1, a detection device 1 includes a sensor base member 21, a sensor 10, a gate line drive circuit 15, a signal line selection circuit 16, a detection circuit 48, a control circuit 122, a power supply circuit 123, first light sources 61, and second light sources 62. FIG. 1 illustrates an example in which a first light source base member 51 is provided with the first light sources 61 and a second light source base member 52 is provided with the second light sources 62. However, the arrangement of the first and the second light sources 61 and 62 illustrated in FIG. 1 is merely an example, and can be changed as appropriate. For example, the first and the second light sources 61 and 62 may be arranged on each of the first and the second light source base members 51 and 52. In this case, a group including the first light sources 61 and a group including the second light sources 62 may be arranged in a second direction Dy, or the first and the second light sources 61 and 62 may be alternately arranged in the second direction Dy. The first and the second light sources 61 and 62 may be provided on one light source base member, or three or more light source base members. A specific example of the arrangement of the first and the second light sources 61 and 62 will be described later.

The detection device 1 is electrically coupled to a host 200. The host 200 is, for example, a higher-level control device for an apparatus (not illustrated) to which the detection device 1 is applied. The host 200 transmits a predetermined detection command signal (start command) to the detection device 1. The host 200 also receives detection information data from the detection device 1 and performs a predetermined biometric information acquisition process. Specific examples of the detection command signal (start command) transmitted to the detection device 1, a data format of the detection information data received from the detection device 1, and the biometric information acquisition process in the host 200 will be described later.

The sensor base member 21 is electrically coupled to a control substrate 121 through a flexible printed circuit board 71. The flexible printed circuit board 71 is provided with the detection circuit 48. The control substrate 121 is provided with the control circuit 122, the power supply circuit 123, and an output circuit 126.

The control circuit 122 is, for example, a control integrated circuit (IC) that outputs logic control signals. The control circuit 122 may be, for example, a programmable logic device (PLD) such as a field-programmable gate array (FPGA).

The control circuit 122 supplies control signals to the sensor 10, the gate line drive circuit 15, and the signal line selection circuit 16 to control a detection operation of the sensor 10. The control circuit 122 also supplies control signals to the first and the second light sources 61 and 62 to control lighting and non-lighting of the first and the second light sources 61 and 62.

The power supply circuit 123 supplies voltage signals including, for example, a sensor power supply potential VDDSNS (refer to FIG. 4) to the sensor 10, the gate line drive circuit 15, and the signal line selection circuit 16. The power supply circuit 123 also supplies a power supply voltage to the first and the second light sources 61 and 62.

The output circuit 126 is, for example, a Universal Serial Bus (USB) controller IC, and controls communication between the control circuit 122 and the host 200.

The sensor base member 21 has a detection area AA and a peripheral area GA. The detection area AA is an area provided with a plurality of optical sensors PD (refer to FIG. 4) included in the sensor 10. The peripheral area GA is an area between the outer perimeter of the detection area AA and the ends of the sensor base member 21 and is an area provided with no optical sensors PD.

The gate line drive circuit 15 and the signal line selection circuit 16 are provided in the peripheral area GA. Specifically, the gate line drive circuit 15 is provided in an area extending along the second direction Dy in the peripheral area GA. The signal line selection circuit 16 is provided in an area extending along a first direction Dx in the peripheral area GA and is provided between the sensor 10 and the detection circuit 48.

The first direction Dx is one direction in a plane parallel to the sensor base member 21. The second direction Dy is one direction in the plane parallel to the sensor base member 21, and is a direction orthogonal to the first direction Dx. The second direction Dy may non-orthogonally intersect the first direction Dx. A third direction Dz is a direction orthogonal to the first direction Dx and the second direction Dy, and is a direction normal to the sensor base member 21.

The first light sources 61 are provided on the first light source base member 51, and are arranged along the second direction Dy. The second light sources 62 are provided on the second light source base member 52, and are arranged along the second direction Dy. The first light source base member 51 and the second light source base member 52 are electrically coupled, through respective terminals 124 and 125 provided on the control substrate 121, to the control circuit 122 and the power supply circuit 123.

For example, inorganic light-emitting diodes (LEDs) or organic electroluminescent (EL) diodes (organic light-emitting diodes (OLEDs)) are used as the first and the second light sources 61 and 62. The first and the second light sources 61 and 62 emit first light and second light, respectively, having different wavelengths.

The first light emitted from the first light sources 61 is mainly reflected, for example, on a surface of an object to be detected, such as a finger Fg, and is incident on the sensor 10. As a result, the sensor 10 can detect a fingerprint by detecting a shape of asperities on the surface of the finger Fg or the like. The second light emitted from the second light sources 62 is, for example, reflected in the finger Fg or the like, or transmitted through the finger Fg or the like, and is incident on the sensor 10. As a result, the sensor 10 can detect information on a living body in the finger Fg or the like. Examples of the information on the living body include pulse waves, pulsation, and a vascular image of the finger Fg or a palm. That is, the detection device 1 may be configured as a fingerprint detection device to detect the fingerprint or a vein detection device to detect a vascular pattern of, for example, veins.

The first light may have a wavelength of 520 nm to 600 nm, for example, a wavelength of approximately 550 nm, and the second light may have a wavelength of 780 nm to 950 nm, for example, a wavelength of approximately 850 nm. In this case, the first light is visible light in blue or green (blue light or green light), and the second light is infrared light. The sensor 10 can detect the fingerprint based on the first light emitted from the first light sources 61. The second light emitted from the second light sources 62 is reflected in the object to be detected such as the finger Fg, or transmitted through or absorbed by the finger Fg or the like, and is incident on the sensor 10. As a result, the sensor 10 can detect the pulse waves or the vascular image (vascular pattern) as the information on the living body in the finger Fg or the like.

Alternatively, the first light may have a wavelength of 600 nm to 700 nm, for example, approximately 660 nm, and the second light may have a wavelength of 780 nm to 950 nm, for example, approximately 850 nm. In this case, the sensor 10 can detect a blood oxygen level in addition to the pulse waves, the pulsation, and the vascular image as the information on the living body based on the first light emitted from the first light sources 61 and the second light emitted from the second light sources 62. As described above, the detection device 1 includes the first and the second light sources 61 and 62, and performs the detection based on the first light and the detection based on the second light, and thereby can detect the various types of information on the living body.

Figure 2:
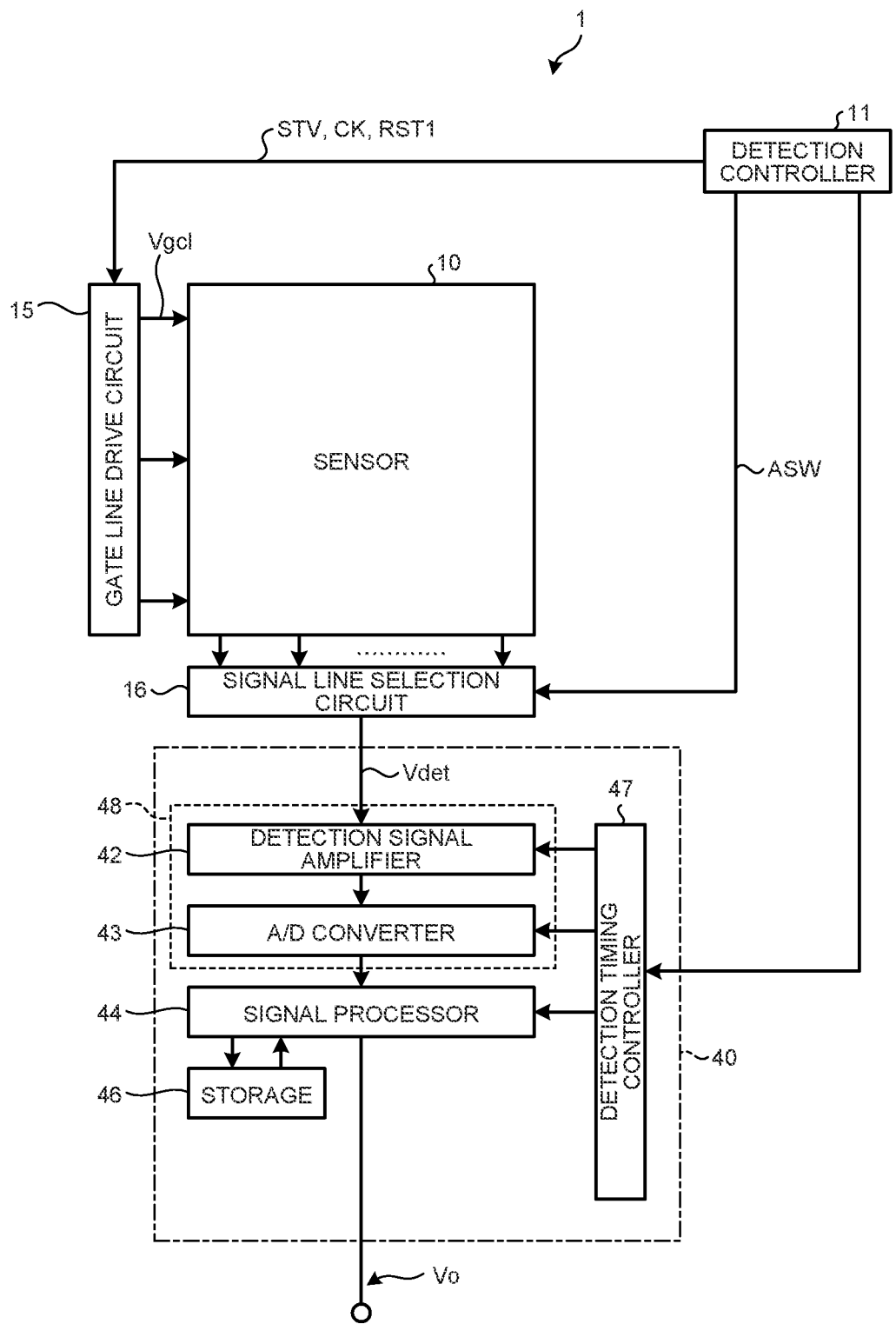
FIG. 2 is a block diagram illustrating a configuration example of the detection device according to the embodiment.

FIG. 2 is a block diagram illustrating a configuration example of the detection device according to the embodiment. As illustrated in FIG. 2, the detection device 1 further includes a detection controller (detection control circuit) 11 and a detector (detection signal processing circuit) 40.

The sensor 10 includes the optical sensors PD. Each of the optical sensors PD included in the sensor 10 is a photodiode and outputs an electrical signal corresponding to light received by the optical sensor PD as a detection signal Vdet to the signal line selection circuit 16. The sensor 10 performs the detection according to a gate drive signal Vgcl supplied from the gate line drive circuit 15.

The detection controller 11 is a circuit that supplies respective control signals to the gate line drive circuit the signal line selection circuit 16, and the detector to control operations of these components. The detection controller 11 supplies various control signals including, for example, a start signal STV, a clock signal CK, and a reset signal RST1 to the gate line drive circuit 15. The detection controller 11 also supplies various control signals including, for example, a selection signal ASW to the signal line selection circuit 16. The detection controller 11 also supplies various control signals to the first and the second light sources 61 and 62 to control the lighting and the non-lighting of each group of the first and the second light sources 61 and 62.

The gate line drive circuit 15 is a circuit that drives a plurality of gate lines GCL (refer to FIG. 3) based on the various control signals. The gate line drive circuit 15 sequentially or simultaneously selects the gate lines GCL, and supplies the gate drive signals Vgcl to the selected gate lines GCL. By this operation, the gate line drive circuit 15 selects the optical sensors PD coupled to the gate lines GCL.

Figure 3:
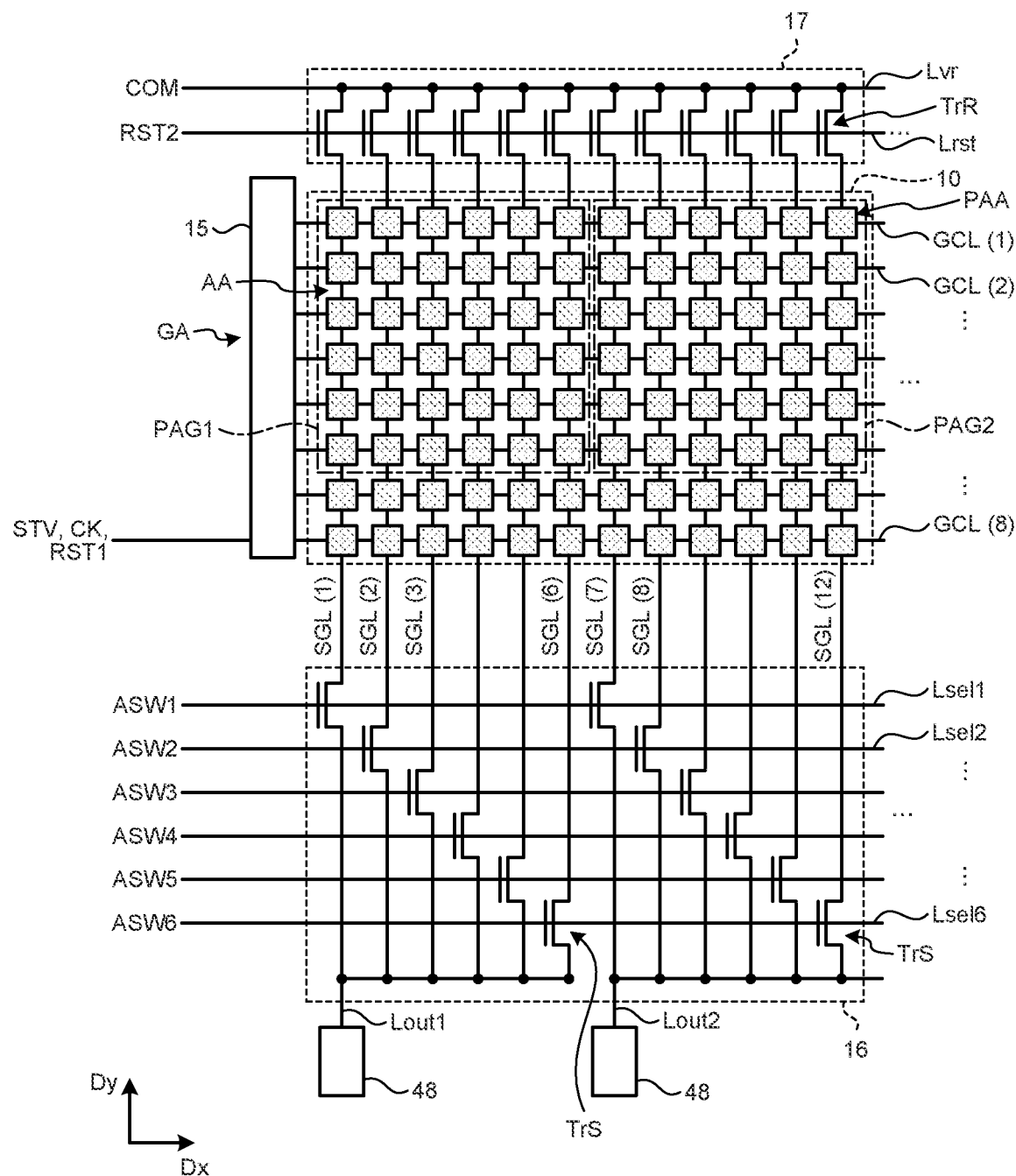
FIG. 3 is a circuit diagram illustrating the detection device.

The signal line selection circuit 16 is a switch circuit that sequentially or simultaneously selects a plurality of signal lines SGL (refer to FIG. 3). The signal line selection circuit 16 is, for example, a multiplexer. The signal line selection circuit 16 electrically couples the selected signal lines SGL to the detection circuit 48 based on the selection signal ASW supplied from the detection controller 11. By this operation, the signal line selection circuit 16 outputs the detection signal Vdet of the optical sensor PD to the detector 40.

The detector 40 includes the detection circuit 48, a signal processor (signal processing circuit) 44, a storage (storage circuit) 46, and a detection timing controller (detection timing control circuit) 47. Based on a control signal supplied from the detection controller 11, the detection timing controller 47 controls the detection circuit 48 and the signal processor 44 so as to operate in synchronization with each other.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signal Vdet. The A/D converter 43 converts an analog signal output from the detection signal amplifier 42 into a digital signal.

In the present disclosure, the control circuit 122 includes the signal processor 44. The signal processor 44 is a logic circuit that adds predetermined header information to an output signal of the detection circuit 48. The header information added by the signal processor 44 will be described later. The signal processor 44 outputs data Vo to which the header information has been added.

In the present disclosure, the control circuit 122 includes the storage 46. The storage 46 temporarily stores therein signals processed by the signal processor 44. The storage 46 may be, for example, a random-access memory (RAM) or a register circuit.

The following describes a circuit configuration example of the detection device 1. FIG. 3 is a circuit diagram illustrating the detection device. As illustrated in FIG. 3, the sensor 10 has a plurality of partial detection areas PAA arranged in a matrix having a row-column configuration. Each of the partial detection areas PAA is provided with the optical sensor PD.

The gate lines GCL extend in the first direction Dx and are each coupled to the partial detection areas PAA arranged in the first direction Dx. A plurality of gate lines GCL(1), GCL(2), . . . , GCL(8) are arranged in the second direction Dy and are each coupled to the gate line drive circuit 15. In the following description, the gate lines GCL(1), GCL(2), . . . , GCL(8) will each be simply referred to as the gate line GCL when they need not be distinguished from one another. For ease of understanding of the description, FIG. 3 illustrates eight gate lines GCL. However, this is merely an example, and M gate lines GCL (where M is 8 or larger, and is, for example, 256) may be arranged.

The signal lines SGL extend in the second direction Dy and are each coupled to the optical sensors PD of the partial detection areas PAA arranged in the second direction Dy. A plurality of signal lines SGL(1), SGL(2), . . . , SGL(12) are arranged in the first direction Dx, and are each coupled to the signal line selection circuit 16 and a reset circuit 17. In the following description, the signal lines SGL(1), SGL(2), . . . , SGL(12) will each be simply referred to as the signal line SGL when they need not be distinguished from one another.

For ease of understanding of the description, 12 signal lines SGL are illustrated. However, this is merely an example, and N signal lines SGL (where N is 12 or larger, and is, for example, 252) may be arranged. In FIG. 3, the sensor 10 is provided between the signal line selection circuit 16 and the reset circuit 17. The present disclosure is not limited thereto. The signal line selection circuit 16 and the reset circuit 17 may be coupled to ends of the signal lines SGL on the same side.

The gate line drive circuit 15 receives the various control signals including, for example, the start signal STV, the clock signal CK, and the reset signal RST1 from the control circuit 122 (refer to FIG. 1). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The gate line drive circuit 15 may perform different driving for each of detection modes including the detection of a fingerprint and the detection of a plurality of different items of information on the living body (including, for example, the pulse waves, the pulsation, the vascular image, and the blood oxygen level, which are hereinafter called also simply "biometric information"). For example, the gate line drive circuit 15 may collectively drive more than one of the gate lines GCL.

Specifically, the gate line drive circuit 15 simultaneously selects a predetermined number of the gate lines GCL from among the gate lines GCL(1), GCL(2), . . . , GCL(8) based on the control signals. For example, the gate line drive circuit 15 simultaneously selects six gate lines GCL(1) to GCL(6) and supplies thereto the gate drive signals Vgcl. The gate line drive circuit 15 supplies the gate drive signals Vgcl through the selected six gate lines GCL to the first switching elements Tr. By this operation, block units PAG1 and PAG2 each including more than one of the partial detection areas PAA arranged in the first direction Dx and the second direction Dy are selected as the respective detection targets. The gate line drive circuit 15 collectively drives the predetermined number of the gate lines GCL, and sequentially supplies the gate drive signals Vgcl to each unit of the predetermined number of the gate lines GCL.

The signal line selection circuit 16 includes a plurality of selection signal lines Lsel, a plurality of output signal lines Lout, and third switching elements TrS. The third switching elements TrS are provided correspondingly to the signal lines SGL. Six signal lines SGL(1), SGL(2), . . . , SGL(6) are coupled to a common output signal line Lout1. Six signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in each of the signal line blocks. Each of the selection signal lines Lsel is coupled to the gates of corresponding ones of the third switching elements TrS in the signal line blocks.

Specifically, selection signal lines Lsel1, Lsel2, . . . , Lsel6 are coupled to the third switching elements TrS corresponding to the signal lines SGL(1), SGL(2), . . . , SGL(6), respectively. The selection signal line Lsel1 is coupled to one of the third switching elements TrS corresponding to the signal line SGL(1) and one of the third switching elements TrS corresponding to the signal line SGL(7). The selection signal line Lsel2 is coupled to one of the third switching elements TrS corresponding to the signal line SGL(2) and one of the third switching elements TrS corresponding to the signal line SGL(8).

The control circuit 122 (refer to FIG. 1) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection device 1 can reduce the number of integrated circuits (ICs) including the detection circuit 48 or the number of terminals of the ICs.

The signal line selection circuit 16 may collectively couple more than one of the signal lines SGL to the detection circuit 48. Specifically, the control circuit 122 (refer to FIG. 1) simultaneously supplies the selection signal ASW to the selection signal lines Lsel. The signal line selection circuit 16 operates the third switching elements TrS to select the signal lines SGL (for example, six signal lines SGL) in one of the signal line blocks, and couples the signal lines SGL to the detection circuit 48. As a result, the signals detected in each of the block units PAG1 and PAG2 are output to the detection circuit 48. In this case, the signals from the partial detection areas PAA (optical sensors PD) included in each of the block units PAG1 and PAG2 are put together and output to the detection circuit 48.

The detection is performed for each of the block units PAG1 and PAG2 by the operations of the gate line drive circuit 15 and the signal line selection circuit 16. As a result, the strength of the detection signal Vdet obtained by a one-time detection operation increases, so that the sensor sensitivity can be improved.

In the present disclosure, the detection device 1 can change the number of the partial detection areas PAA (optical sensors PD) included in each of the block units PAG1 and PAG2. Thereby, the value of resolution per inch (pixels per inch (ppi), hereinafter, referred to as "definition") can be set based on the information to be acquired.

For example, the number of the partial detection areas PAA (optical sensors PD) included in each of the block units PAG1 and PAG2 is relatively reduced. This setting results in a longer detection time and a lower frame rate (for example, 20 frames per second (fps) or lower), however, the detection can be performed at a higher definition (for example, at 300 ppi or higher). Hereafter, the term "first mode" denotes a mode of performing the detection at the lower frame rate and the higher definition. By selecting the first mode of performing the detection at the lower frame rate and the higher definition, for example, the fingerprint on the surface of the finger Fg can be acquired at the higher definition.

Alternatively, for example, the number of the partial detection areas PAA (optical sensors PD) included in each of the block units PAG1 and PAG2 is relatively increased. This setting results in a lower definition (for example, 50 ppi or lower), however, the detection can be performed at a higher frame rate (for example, at 100 fps or higher) that allows the detection to be repeatedly performed in a shorter time in one frame. Hereafter, the term "second mode" denotes a mode of performing the detection at the higher frame rate and the lower definition. By selecting the second mode of performing the detection at the higher frame rate and the lower definition, for example, temporal changes in the pulse waves can be more accurately detected. In the second mode, calculation of a pulse wave velocity and calculation of blood pressure and the like are enabled by using the pulse waves acquired at the higher frame rate (for example, 1000 fps or higher).

For example, when acquiring the vascular image (vein pattern), the number of the partial detection areas PAA (optical sensors PD) included in each of the block units PAG1 and PAG2 is set to an intermediate value between those of the first mode and the second mode. This setting allows the detection to be performed at a medium frame rate higher than that of the first mode and lower than that of the second mode (for example, higher than 20 fps and lower than 100 fps) and at a medium definition lower than that of the first mode and higher than that of the second mode (for example, higher than 50 ppi and lower than 300 ppi). Hereafter, the term "third mode" denotes a mode of performing the detection at the medium frame rate and the medium definition. The third mode of performing the detection at the medium frame rate and the medium definition is suitable for, for example, acquiring the vascular pattern of veins and the like.

As illustrated in FIG. 3, the reset circuit 17 includes a reference signal line Lvr, a reset signal line Lrst, and fourth switching elements TrR. The fourth switching elements TrR are provided correspondingly to the signal lines SGL. The reference signal line Lvr is coupled to either the sources or the drains of the fourth switching elements TrR. The reset signal line Lrst is coupled to the gates of the fourth switching elements TrR.

The control circuit 122 supplies a reset signal RST2 to the reset signal line Lrst. This operation turns on the fourth switching elements TrR to electrically couple the signal lines SGL to the reference signal line Lvr. The power supply circuit 123 supplies a reference signal COM to the reference signal line Lvr. This operation supplies the reference signal COM to a capacitive element Ca (refer to FIG. 4) included in each of the partial detection areas PAA.

Figure 4:
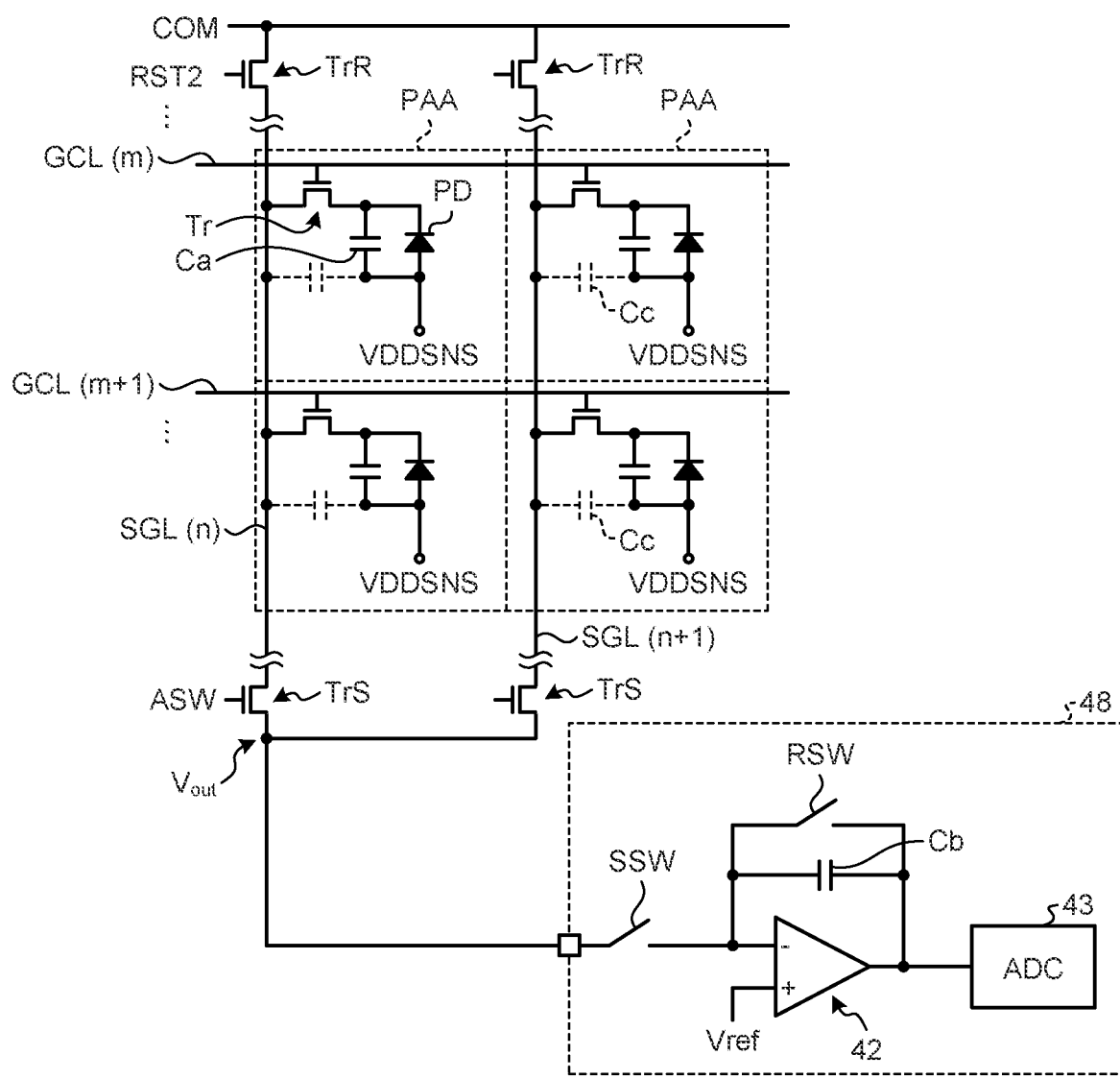
FIG. 4 is a circuit diagram illustrating a plurality of partial detection areas.

FIG. 4 is a circuit diagram illustrating the partial detection areas of the detection device according to the embodiment. FIG. 4 also illustrates a circuit configuration of the detection circuit 48. As illustrated in FIG. 4, each of the partial detection areas PAA includes the optical sensor PD, the capacitive element Ca, and a corresponding one of the first switching elements Tr1. The capacitive element Ca is capacitance (sensor capacitance) generated in the optical sensor PD, and is equivalently coupled in parallel to the optical sensor PD. In addition, signal line capacitance Cc is parasitic capacitance generated on each of the signal lines SGL, and is equivalently generated between the signal line SGL and a node between the anode of the optical sensor PD and one end side of the capacitive element Ca.

FIG. 4 illustrates two gate lines GCL(m) and GCL(m+1) arranged in the second direction Dy among the gate lines GCL. FIG. 4 also illustrates two signal lines SGL(n) and SGL(n+1) arranged in the first direction Dx among the signal lines SGL. The partial detection area PAA is an area surrounded by the gate lines GCL and the signal lines SGL.

Each of the first switching elements Tr is provided correspondingly to the optical sensor PD. The first switching element Tr is formed of a thin-film transistor, and in this example, formed of an n-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the optical sensor PD and the capacitive element Ca.

The anode of the optical sensor PD is supplied with the sensor power supply potential VDDSNS from the power supply circuit 123. The signal line SGL and the capacitive element Ca are supplied with the reference signal COM that serves as an initial potential of the signal line SGL and the capacitive element Ca from the power supply circuit 123.

When the partial detection area PAA is irradiated with light, a current corresponding to the amount of the light flows to the optical sensor PD. As a result, an electric charge is stored in the capacitive element Ca. After the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 1 can detect the signal corresponding to the amount of the light irradiating the optical sensor PD in each of the partial detection areas PAA or each of the block units PAG1 and PAG2.

During a read period Pdet (refer to FIG. 6), a switch SSW of the detection circuit 48 is turned on to couple the detection circuit 48 to the signal lines SGL. The detection signal amplifier 42 of the detection circuit 48 converts a current supplied from the signal lines SGL into a voltage corresponding to the value of the current, and amplifies the result. A reference potential (Vref) having a fixed potential is supplied to a non-inverting input terminal (+) of the detection signal amplifier 42, and the signal lines SGL are coupled to an inverting input terminal (−) of the detection signal amplifier 42. In the embodiment, the same signal as the reference signal COM is supplied as the reference potential (Vref) voltage. The detection signal amplifier 42 includes a capacitive element Cb and a reset switch RSW. During a reset period Prst (refer to FIG. 6), the reset switch RSW is turned on, and the electric charge of the capacitive element Cb is reset.

Figure 5A:
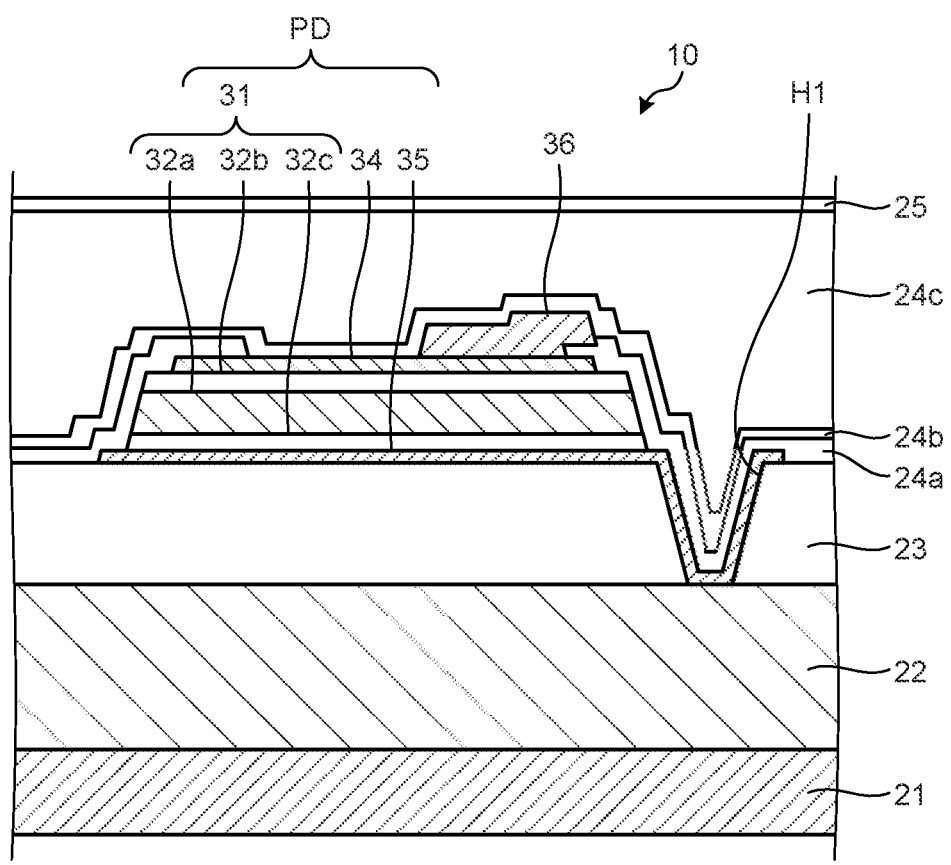
FIG. 5A is a sectional view illustrating a schematic sectional configuration of a sensor.

The following describes a configuration of the optical sensor PD. FIG. 5A is a sectional view illustrating a schematic sectional configuration of the sensor. As illustrated in FIG. 5A, the sensor 10 includes the sensor base member 21, a TFT layer 22, an insulating layer 23, the optical sensor PD, and insulating layers 24a, 24b, 24c, and 25. The sensor base member 21 is an insulating base member, and is made using, for example, glass or a resin material. The sensor base member 21 is not limited to having a flat plate shape, but may have a curved surface. In this case, the sensor base member 21 can be a film-like resin. The sensor base member 21 has a first surface and a second surface opposite the first surface. The TFT layer 22, the insulating layer 23, the optical sensor PD, and the insulating layers 24 and 25 are stacked in this order on the first surface.

The TFT layer 22 is provided with circuits such as the gate line drive circuit 15 and the signal line selection circuit 16 described above. The TFT layer 22 is also provided with TFTs, such as the first switching elements Tr, and various types of wiring, such as the gate lines GCL and the signal lines SGL. The sensor base member 21 and the TFT layer 22 serve as a drive circuit board that drives the sensor for each predetermined detection area, and are also called a backplane or an array substrate.

The insulating layer 23 is an organic insulating layer, and is provided on the TFT layer 22. The insulating layer 23 is a planarizing layer that planarizes asperities formed by the first switching elements Tr and various conductive layers formed in the TFT layer 22.

The optical sensor PD is provided on the insulating layer 23. The optical sensor PD includes a lower electrode 35, a semiconductor layer 31, and an upper electrode 34, which are stacked in this order.

The lower electrode 35 is provided on the insulating layer 23, and is electrically coupled to the first switching element Tr in the TFT layer 22 through a contact hole H1. The lower electrode 35 is the cathode of the optical sensor PD and is an electrode for reading the detection signal Vdet. A metal material such as molybdenum (Mo) or aluminum (Al) is used as the lower electrode 35. Alternatively, the lower electrode 35 may be a multilayered film formed by stacking these metal materials. The lower electrode 35 may be formed of, for example, a light-transmitting conductive material such as indium tin oxide (ITO).

The semiconductor layer 31 is formed of amorphous silicon (a-Si). The semiconductor layer 31 includes an i-type semiconductor layer 32a, a p-type semiconductor layer 32b, and an n-type semiconductor layer 32c. The i-type semiconductor layer 32a, the p-type semiconductor layer 32b, and the n-type semiconductor layer 32c are one specific example of a photoelectric conversion element. In FIG. 5A, the n-type semiconductor layer 32c, the i-type semiconductor layer 32a, and the p-type semiconductor layer 32b are stacked in this order in a direction orthogonal to a surface of the sensor base member 21. However, the semiconductor layer 31 may have a reversed configuration, that is, the p-type semiconductor layer 32b, the i-type semiconductor layer 32a, and the n-type semiconductor layer 32c may be stacked in this order. The semiconductor layer 31 may be a photoelectric conversion element formed of organic semiconductors.

The a-Si of the n-type semiconductor layer 32c is doped with impurities to form an n+ region. The a-Si of the p-type semiconductor layer 32b is doped with impurities to form a p+ region. The i-type semiconductor layer 32a is, for example, a non-doped intrinsic semiconductor, and has lower conductivity than that of the p-type semiconductor layer 32b and the n-type semiconductor layer 32c.

The upper electrode 34 is the anode of the optical sensor PD, and is an electrode for supplying the power supply potential VDDSNS to the photoelectric conversion layers. The upper electrode 34 is a light-transmitting conductive layer of, for example, ITO, and is provided in common to for all the optical sensors PD.

The insulating layers 24a and 24b are provided on the insulating layer 23. The insulating layer 24a covers the periphery of the upper electrode 34, and is provided with an opening in a position overlapping the upper electrode 34. Coupling wiring 36 is coupled to the upper electrode 34 at a portion of the upper electrode 34 not provided with the insulating layer 24a. The insulating layer 24b is provided on the insulating layer 24a so as to cover the upper electrode 34 and the coupling wiring 36. The insulating layer 24c serving as a planarizing layer is provided on the insulating layer 24b. The insulating layer is provided on the insulating layer 24c. However, the insulating layer 25 need not be provided.

Figure 5B:
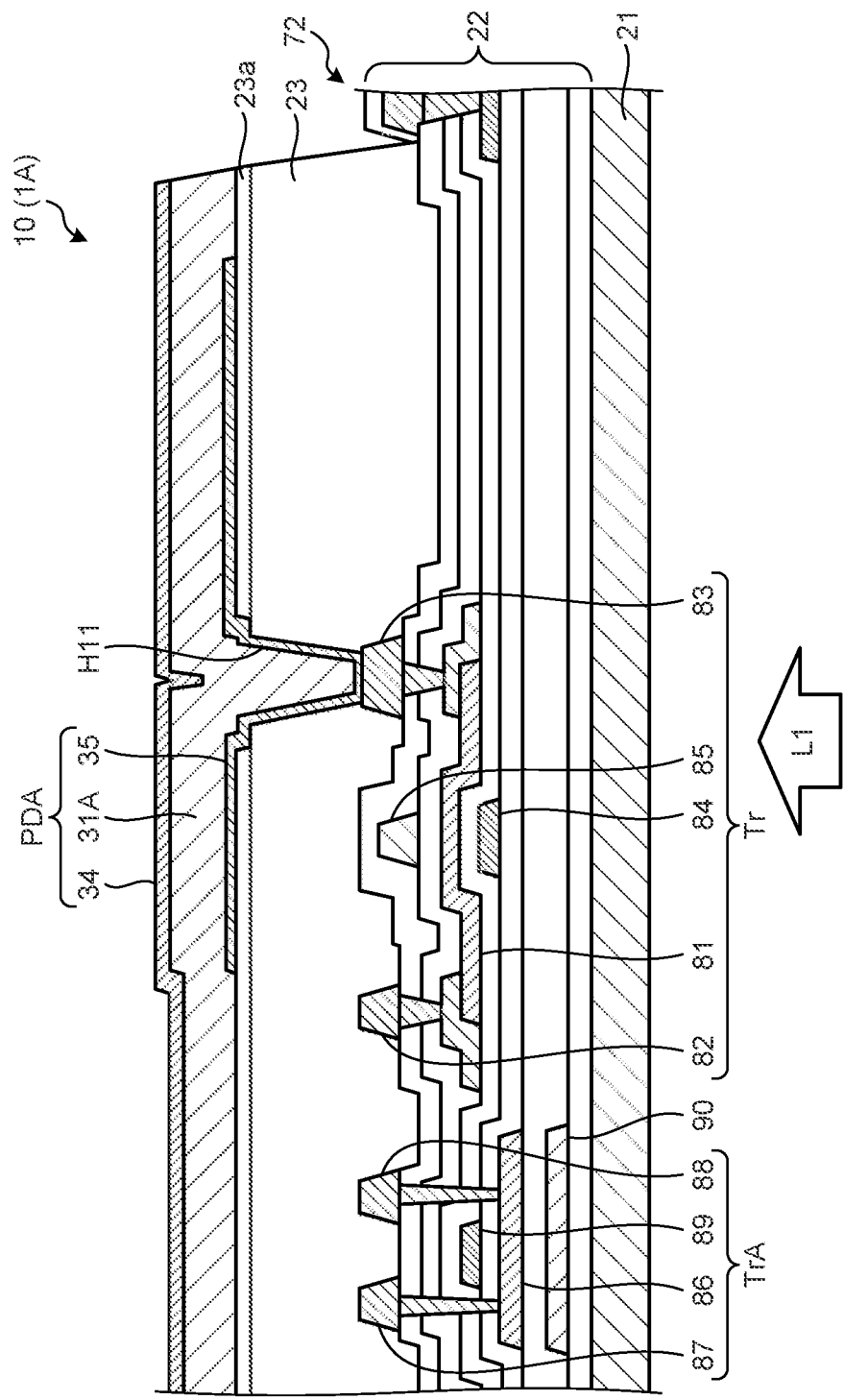
FIG. 5B is a sectional view illustrating a schematic sectional configuration of the sensor of a detection device according to a first modification.

FIG. 5B is a sectional view illustrating a schematic sectional configuration of the sensor of a detection device according to a first modification. As illustrated in FIG. in a detection device 1A of the first modification, an optical sensor PDA is provided above an insulating layer 23a. The insulating layer 23a is an inorganic insulating layer provided to cover the insulating layer 23, and is formed of silicon nitride (SiN), for example. The optical sensor PDA includes a photoelectric conversion layer 31A, the lower electrode 35 (cathode electrode), and the upper electrode 34 (anode electrode). The lower electrode 35, the photoelectric conversion layer 31A, and the upper electrode 34 are stacked in this order in a direction orthogonal to a first surface S1 of the sensor base member 21.

The photoelectric conversion layer 31A changes in characteristics (for example, voltage-current characteristics and a resistance value) in accordance with light emitted thereto. An organic material is used as a material of the photoelectric conversion layer 31A. Specifically, as the photoelectric conversion layer 31A, low-molecular-weight organic materials can be used, such as fullerene ($C_{60}$), phenyl-$C_{61}$-butyric acid methyl ester (PCBM), copper phthalocyanine (CuPc), fluorinated copper phthalocyanine ($F_{16}$CuPc), 5,6,11,12-tetraphenyltetracene (rubrene), and perylene diimide (PDI) (derivative of perylene).

The photoelectric conversion layer 31A can be formed by a vapor deposition process (dry process) using the low-molecular-weight organic materials listed above. In this case, the photoelectric conversion layer 31A may be, for example, a multilayered film of CuPc and $F_{16}$CuPc, or a multilayered film of rubrene and $C_{60}$. The photoelectric conversion layer 31A can also be formed by a coating process (wet process). In this case, the photoelectric conversion layer 31A is made using a material obtained by combining the above-listed low-molecular-weight organic materials with high-molecular-weight organic materials. As the high-molecular-weight organic materials, for example, poly(3-hexylthiophene) (P3HT) and F8-alt-benzothiadiazole (F8BT) can be used. The photoelectric conversion layer 31A can be a film in the state of a mixture of P3HT and PCBM, or a film in the state of a mixture of F8BT and PDI.

The lower electrode 35 faces the upper electrode 34 with the photoelectric conversion layer 31A interposed therebetween. A light-transmitting conductive material such as ITO is used as the upper electrode 34. A metal material such as silver (Ag) or aluminum (Al) is used as the lower electrode 35. Alternatively, the lower electrode 35 may be an alloy material containing at least one or more of these metal materials.

The lower electrode 35 can be formed as a light-transmitting transflective electrode by controlling the film thickness of the lower electrode 35. For example, the lower electrode 35 is formed of a thin Ag film having a thickness of 10 nm so as to have light transmittance of approximately 60%. In this case, the optical sensor PDA can detect light emitted from both sides of the sensor base member 21, for example, both light L1 emitted from the first surface S1 side and light emitted from a second surface S2 side.

Although not illustrated in FIG. 5B, the insulating layer 24 may be provided so as to cover the upper electrode 34. The insulating layer is a passivation film, which is provided to protect the optical sensor PDA.

As illustrated in FIG. 5B, the TFT layer 22 is provided with the first switching element Tr electrically coupled to the optical sensor PDA. The first switching element Tr includes a semiconductor layer 81, a source electrode 82, a drain electrode 83, and gate electrodes 84 and 85. The lower electrode 35 of the optical sensor PDA is electrically coupled to the drain electrode 83 of the first switching element Tr through a contact hole H11 provided in the insulating layers 23 and 23a.

The first switching element Tr has what is called a dual-gate structure provided with the gate electrodes 84 and 85 on both the upper and lower sides of the semiconductor layer 81. However, the first switching element Tr is not limited to this structure and may have a top-gate structure or a bottom-gate structure.

FIG. 5B schematically illustrates a second switching element TrA and a terminal 72 that are provided in the peripheral area GA. The second switching element TrA is, for example, a switching element provided in the gate line drive circuit 15 (refer to FIG. 1). The second switching element TrA includes a semiconductor layer 86, a source electrode 87, a drain electrode 88, and a gate electrode 89. The second switching element TrA has what is called a top-gate structure provided with the gate electrode 89 on the upper side of the semiconductor layer 86. A light-blocking layer 90 is provided between the semiconductor layer 86 and the sensor base member 21 on the lower side of the semiconductor layer 86. The second switching element TrA is, however, not limited to this structure, and may have a bottom-gate structure or a dual-gate structure.

The semiconductor layer 81 of the first switching element Tr is provided in a layer different from that of the semiconductor layer 86 of the second switching element TrA. The semiconductor layer 81 of the first switching element Tr is formed of an oxide semiconductor, for example. The semiconductor layer 86 of the second switching element TrA is formed of polysilicon, for example.

Figure 6:
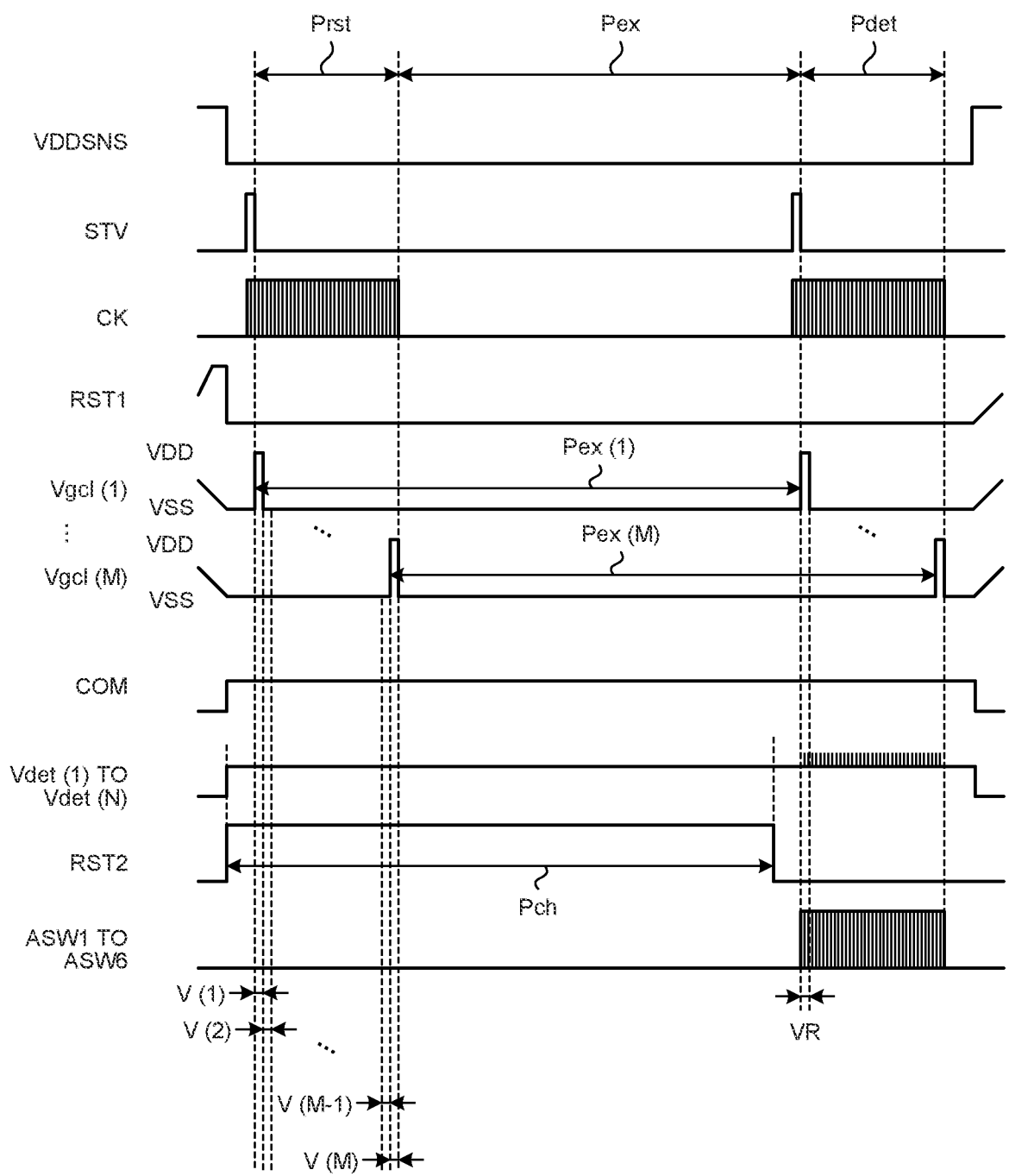
FIG. 6 is a timing waveform diagram illustrating an operation example of the detection device.
Figure 7:
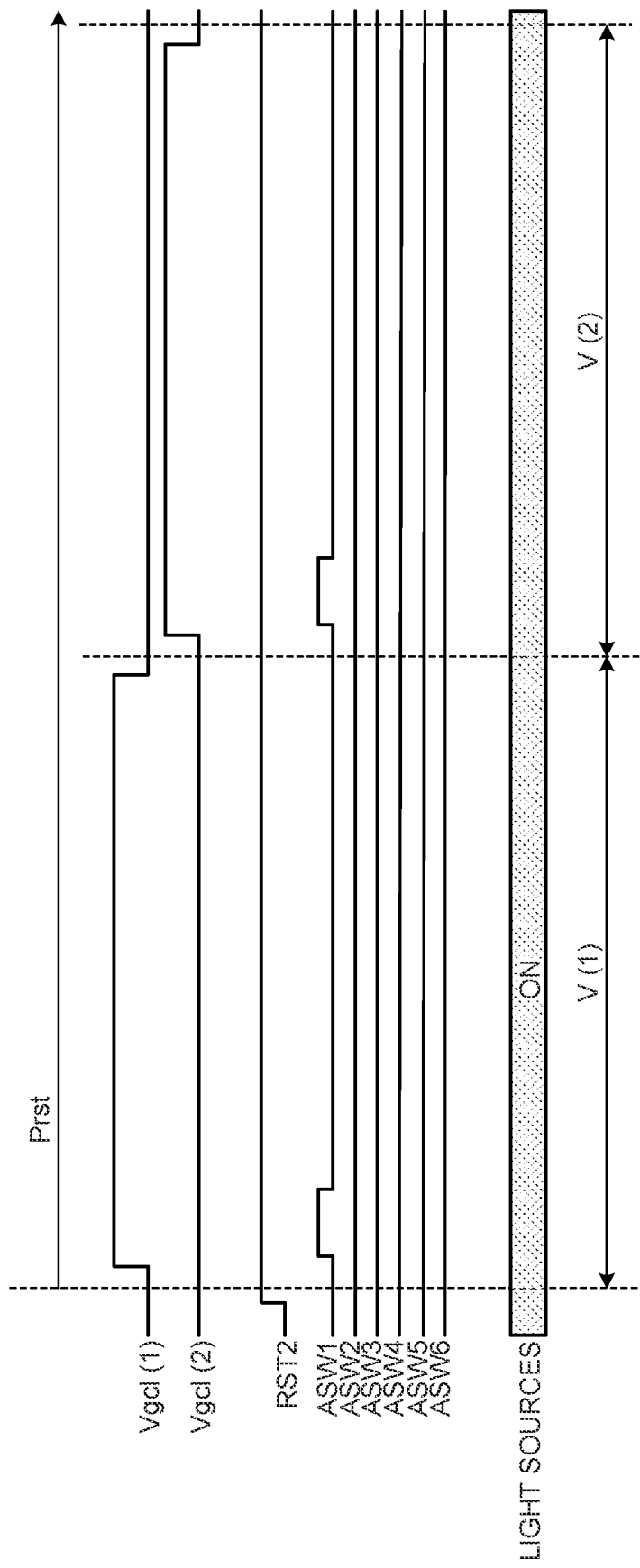
FIG. 7 is a timing waveform diagram illustrating an operation example during a reset period in FIG. 6.
Figure 8:
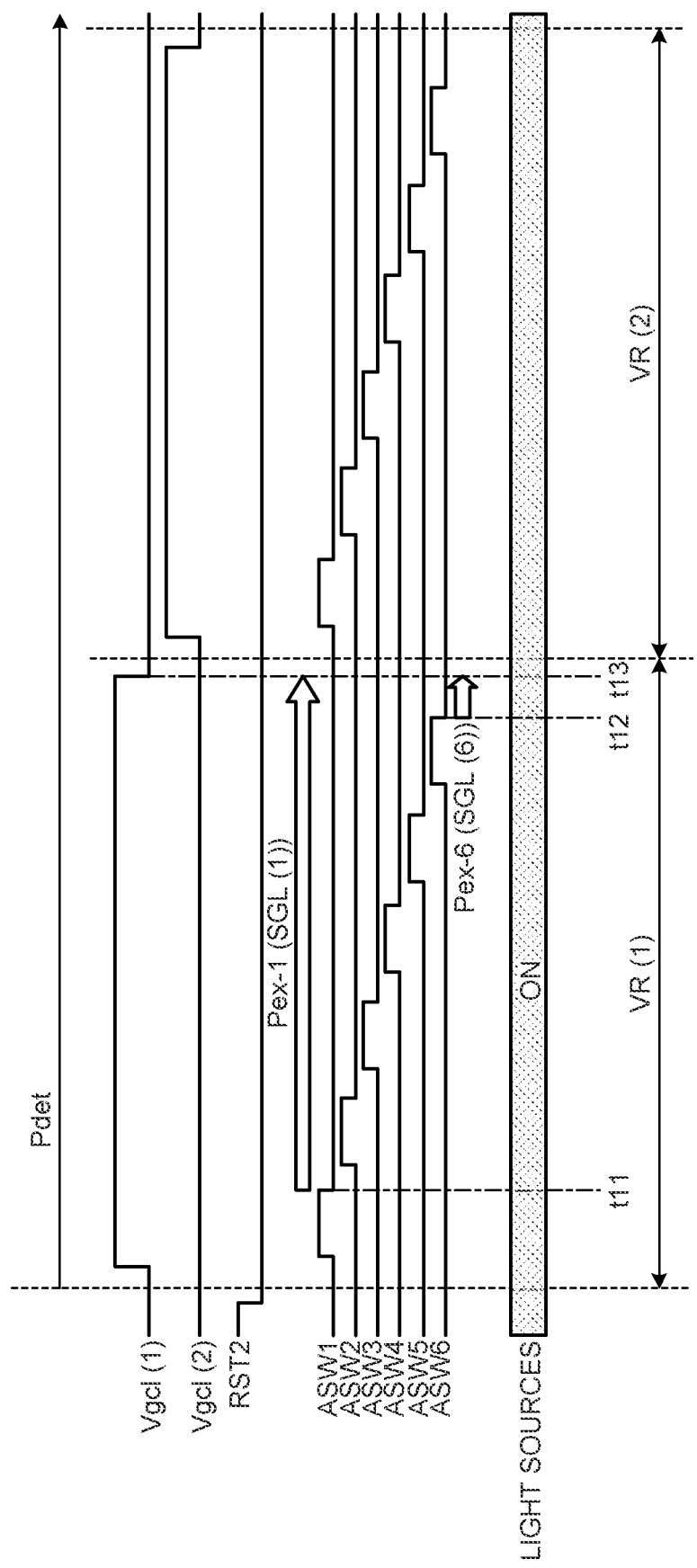
FIG. 8 is a timing waveform diagram illustrating an operation example during a read period in FIG. 6.
Figure 9:
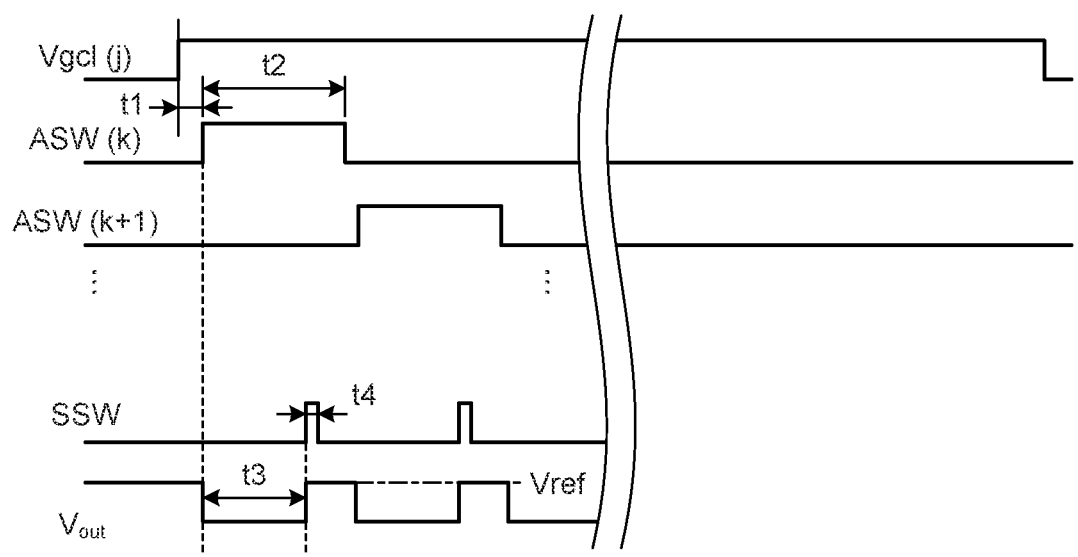
FIG. 9 is a timing waveform diagram illustrating an operation example during a drive period of one gate line included in the read period in FIG. 6.
Figure 10:
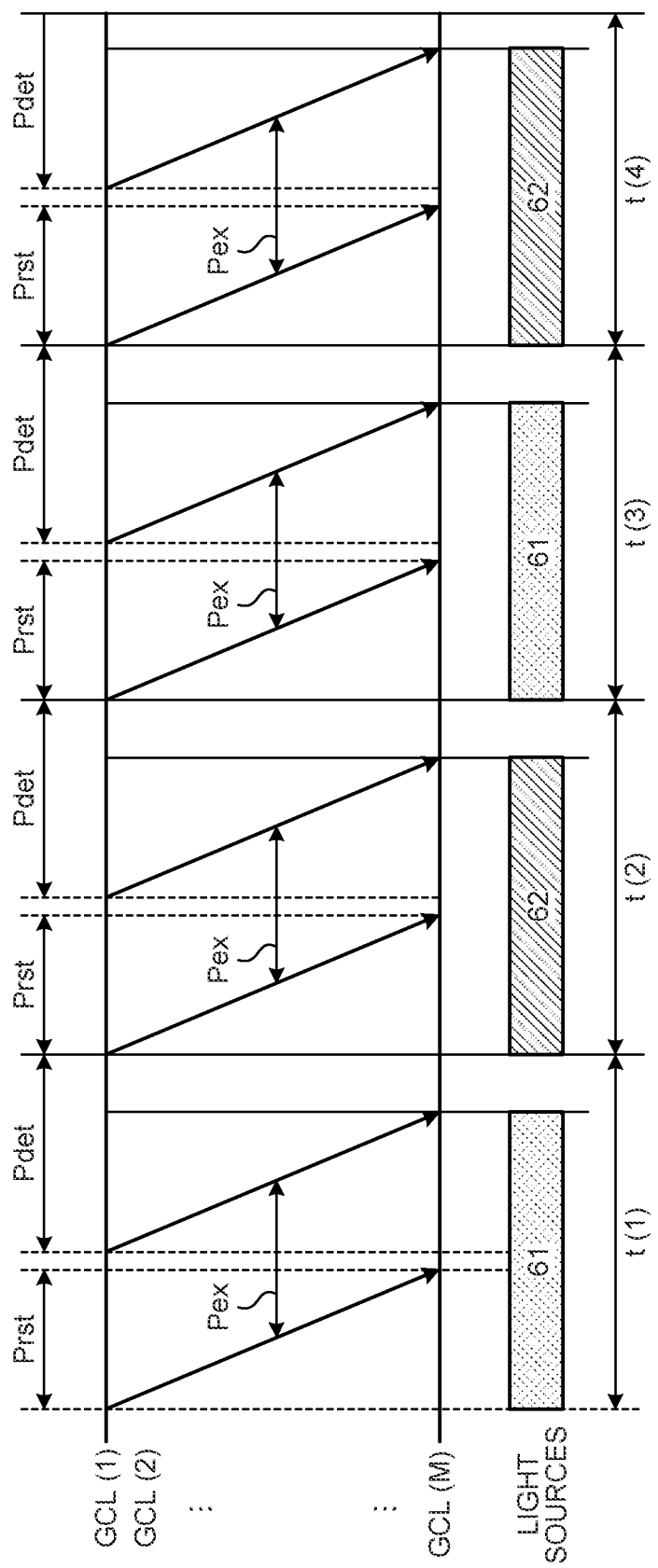
FIG. 10 is an explanatory diagram for explaining a relation between driving of the sensor and lighting operations of light sources in the detection device.

The following describes an operation example of the detection device 1. FIG. 6 is a timing waveform diagram illustrating the operation example of the detection device. FIG. 7 is a timing waveform diagram illustrating the operation example during the reset period in FIG. 6. FIG. 8 is a timing waveform diagram illustrating an operation example during the read period in FIG. 6. FIG. 9 is a timing waveform diagram illustrating an operation example during a drive period of one gate line included in a row read period VR in FIG. 6. FIG. 10 is an explanatory diagram for explaining a relation between driving of the sensor and lighting operations of the light sources in the detection device.

As illustrated in FIG. 6, the detection device 1 has the reset period Prst, an exposure period Pex, and the read period Pdet. The power supply circuit 123 supplies the sensor power supply potential VDDSNS to the anode of the optical sensor PD over the reset period Prst, the exposure period Pex, and the read period Pdet. The sensor power supply potential VDDSNS is a signal that applies a reverse bias between the anode and the cathode of the optical sensor PD. For example, the reference signal COM of substantially 0.75 V is applied to the cathode of the optical sensor PD, and the sensor power supply potential VDDSNS of substantially −1.25 V is applied to the anode thereof. As a result, a reverse bias of substantially 2.0 V is applied between the anode and the cathode. The control circuit 122 sets the reset signal RST2 to "H", and then, supplies the start signal STV and the clock signal CK to the gate line drive circuit 15 to start the reset period Prst. During the reset period Prst, the control circuit 122 supplies the reference signal COM to the reset circuit 17, and uses the reset signal RST2 to turn on the fourth switching elements TrR for supplying a reset voltage. This operation supplies the reference signal COM as the reset voltage to each of the signal lines SGL. The reference signal COM is set to, for example, 0.75 V.

During the reset period Prst, the gate line drive circuit 15 sequentially selects the gate lines GCL based on the start signal STV, the clock signal CK, and the reset signal RST1. The gate line drive circuit 15 sequentially supplies gate drive signals Vgcl {Vgcl(1), . . . , Vgcl(M)} to the gate lines GCL. Each of the gate drive signals Vgcl has a pulsed waveform having a power supply voltage VDD serving as a high-level voltage and a power supply voltage VSS serving as a low-level voltage. In FIG. 6, M gate lines GCL (where M is, for example, 256) are provided, and the gate drive signals Vgcl(1), . . . , Vgcl(M) are sequentially supplied to the respective gate lines GCL. Thus, the first switching elements Tr are sequentially brought into a conducting state and supplied with the reset voltage on a row-by-row basis. For example, a voltage of 0.75 V of the reference signal COM is supplied as the reset voltage.

Specifically, as illustrated in FIG. 7, the gate line drive circuit 15 supplies the gate drive signal Vgcl(1) at the high-level voltage (power supply voltage VDD) to the gate line GCL(1) during a period V(1). The control circuit 122 supplies any one of selection signals ASW1, . . . , ASW6 (selection signal ASW1 in FIG. 7) to the signal line selection circuit 16 during a period in which the gate drive signal Vgcl(1) is at the high-level voltage (power supply voltage VDD). This operation couples the signal line SGL of the partial detection area PAA selected by the gate drive signal Vgcl(1) to the detection circuit 48. As a result, the reset voltage (reference signal COM) is also supplied to coupling wiring between the third switching element TrS and the detection circuit 48.

In the same manner, the gate line drive circuit 15 supplies the gate drive signals Vgcl(2), . . . , Vgcl(M−1), Vgcl(M) at the high-level voltage to gate lines GCL(2), . . . , GCL(M−1), GCL(M) during periods V(2), . . . , V(M−1), V(M), respectively.

Thus, during the reset period Prst, the capacitive elements Ca of all the partial detection areas PAA are sequentially electrically coupled to the signal lines SGL, and are supplied with the reference signal COM. As a result, the capacitance of the capacitive elements Ca is reset. The capacitance of the capacitive elements Ca of some of the partial detection areas PAA can be reset by partially selecting the gate lines and the signal lines SGL.

Examples of the method of controlling the exposure include a method of controlling the exposure during non-selection of the gate lines and a method of always controlling the exposure. In the method of controlling the exposure during non-selection of the gate lines, the gate drive signals {Vgcl(1), . . . , Vgcl(M)} are sequentially supplied to all the gate lines GCL coupled to the optical sensors PD serving as the detection targets, and all the optical sensors PD serving as the detection targets are supplied with the reset voltage. Then, after all the gate lines GCL coupled to the optical sensors PD serving as the detection targets are set to a low voltage (the first switching elements Tr are turned off), the exposure starts and the exposure is performed during the exposure period Pex. In this control method of exposure during non-selection of gate lines, the light sources are on only during the exposure period Pex illustrated in FIG. 6. After the light sources are turned off and the exposure ends, the gate drive signals {Vgcl(1), . . . , Vgcl(M)} are sequentially supplied to the gate lines GCL coupled to the optical sensors PD serving as the detection targets as described above, and reading is performed during the read period Pdet. In the method of always controlling the exposure, the control for performing the exposure is also performed during the reset period Prst and the read period Pdet (the exposure is always controlled). In this case, the actual exposure period Pex(1) starts immediately after the gate drive signal Vgcl(1) supplied to the gate line GCL becomes L, H, and then L during the reset period Prst. The exposure periods Pex {(1), ..., (M)} are periods during which the capacitive elements Ca are charged from the optical sensors PD. The electric charge stored in the capacitive element Ca during the reset period Prst causes a reverse directional current (from cathode to anode) to flow through the optical sensor PD due to light irradiation, and the potential difference in the capacitive element Ca decreases. The start timing and the end timing of the actual exposure periods Pex(1), ..., Pex(M) are different among the partial detection areas PAA corresponding to the gate lines GCL. Each of the exposure periods Pex(1), ..., Pex(M) starts when the gate drive signal Vgcl changes from the power supply voltage VDD serving as the high-level voltage to the power supply voltage VSS serving as the low-level voltage during the reset period Prst. Each of the exposure periods Pex(1), ..., Pex(M) ends when the gate drive signal Vgcl changes from the power supply voltage VSS to the power supply voltage VDD during the read period Pdet. The lengths of the exposure time of the exposure periods Pex(1), ..., Pex(M) are equal. The present disclosure is not limited to the aspect in which the exposure periods Pex{(1), ..., (M)} coincide with the lighting periods of the light sources. For example, it is sufficient that the light sources keep lighting at least during a period from the start of the exposure period Pex(1) (the start of the reset period Prst for the exposure period Pex(1)) to the end of the exposure period Pex(M) (the end of the reading period Pdet for the exposure period Pex(M)).

During the exposure periods Pex {(1) ... (M)}, a current flows correspondingly to the light irradiating the optical sensor PD in each of the partial detection areas PAA. As a result, an electric charge is stored in each of the capacitive elements Ca.

At a time before the read period Pdet starts, the control circuit 122 sets the reset signal RST2 to a low-level voltage. This operation stops the operation of the reset circuit 17. The reset signal may be set to a high-level voltage only during the reset period Prst. During the read period Pdet, the gate line drive circuit 15 sequentially supplies the gate drive signals Vgcl(1), ..., Vgcl(M) to the gate lines GCL in the same manner as during the reset period Prst.

Specifically, as illustrated in FIG. 8, the gate line drive circuit 15 supplies the gate drive signal Vgcl(1) at the high-level voltage (power supply voltage VDD) to the gate line GCL(1) during a row read period VR(1). The control circuit 122 sequentially supplies the selection signals ASW1, ..., ASW6 to the signal line selection circuit 16 during a period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), ..., Vgcl(M−1), Vgcl(M) at the high-level voltage to the gate lines GCL(2), ..., GCL(M−1), GCL(M) during row read periods VR(2), ..., VR(M−1), VR(M), respectively. That is, the gate line drive circuit 15 supplies the gate drive signal Vgcl to the gate line GCL during each of the row read periods VR(1), VR(2), ..., VR(M−1), VR(M). The signal line selection circuit 16 sequentially selects the signal lines SGL based on the selection signal ASW in each period in which the gate drive signal Vgcl is set to the high-level voltage. The signal line selection circuit 16 sequentially couples each of the signal lines SGL to one detection circuit 48. Thus, the detection device 1 can output the detection signals Vdet of all the partial detection areas PAA to the detection circuit 48 during the read period Pdet.

With reference to FIG. 9, the following describes an operation example during the row read period VR that is a supply period of one gate drive signal Vgcl(j) in FIG. 6. In FIG. 6, the reference numeral of the row read period VR is assigned to the first gate drive signal Vgcl(1). The same also applies to the other gate drive signals Vgcl(2), ..., Vgcl(M). The index j is any one of the natural numbers 1 to M.

As illustrated in FIGS. 9 and 4, an output (Vout) of each of the third switching elements TrS has been reset to the reference potential (Vref) voltage in advance. The reference potential (Vref) voltage serves as the reset voltage, and is set to 0.75 V, for example. Then, the gate drive signal Vgcl(j) is set to a high level, and the first switching elements Tr of a corresponding row are turned on. Thus, each of the signal lines SGL in each row is set to a voltage corresponding to the electric charge stored in the capacitor (capacitive element Ca) of the partial detection area PAA. After a period t1 elapses from a rising edge of the gate drive signal Vgcl(j), a period t2 starts in which the selection signal ASW(k) is set to a high level. After the selection signal ASW(k) is set to the high level to turn on the third switching element TrS, the electric charge stored in the capacitor (capacitive element Ca) of the partial detection area PAA coupled to the detection circuit 48 through the third switching element TrS changes the output (Vout) of the third switching element TrS (refer to FIG. 4) to a voltage corresponding to the electric charge stored in the capacitor (capacitive element Ca) of the partial detection area PAA (in a period t3). In the example of FIG. 9, this voltage is reduced from the reset voltage as illustrated in the period t3. Then, after the switch SSW is turned on (in a period t4 during which an SSW signal is set to a high level), the electric charge stored in the capacitor (capacitive element Ca) of the partial detection area PAA moves to the capacitor (capacitive element Cb) of the detection signal amplifier 42 of the detection circuit 48, and the output voltage of the detection signal amplifier 42 is set to a voltage corresponding to the electric charge stored in the capacitive element Cb. At this time, the potential of the inverting input portion of the detection signal amplifier 42 is a virtual short-circuit potential of an operational amplifier, and therefore, set to the reference potential (Vref). The A/D converter 43 reads the output voltage of the detection signal amplifier 42. In the example of FIG. 9, waveforms of the selection signals ASW(k), ASW(k+1), ..., corresponding to the signal lines SGL of the respective columns are set to a high level to sequentially turn on the third switching elements TrS, and the same operation is sequentially performed to sequentially read the electric charges stored in the capacitors (capacitive elements Ca) of the partial detection areas PAA coupled to the gate line GCL. ASW(k), ASW(k+1), ... in FIG. 9 are, for example, any of ASW1 to ASW6 in FIG. 9.

Specifically, after the period t4 starts in which the switch SSW is on, the electric charge moves from the capacitor (capacitive element Ca) of the partial detection area PAA to the capacitor (capacitive element Cb) of the detection signal amplifier 42 of the detection circuit 48. At this time, the non-inverting input (+) of the detection signal amplifier 42 is set to the reference potential (Vref) voltage (for example, 0.75 V). As a result, the output (Vout) of the third switching element TrS is also set to the reference potential (Vref)

voltage due to the virtual short-circuit between the inputs of the detection signal amplifier 42. The voltage of the capacitive element Cb is set to a voltage corresponding to the electric charge stored in the capacitor (capacitive element Ca) of the partial detection area PAA at a location where the third switching element TrS is turned on in response to the selection signal ASW(k). After the output (Vout) of the third switching element TrS is set to the reference potential (Vref) voltage due to the virtual short-circuit, the output of the detection signal amplifier 42 reaches a voltage corresponding to the capacitance of the capacitive element Cb, and this output voltage is read by the A/D converter 43. The voltage of the capacitive element Cb is, for example, a voltage between two electrodes provided on a capacitor constituting the capacitive element Cb.

The period t1 is 20 μs, for example. The period t2 is 60 μs, for example. The period t3 is 44.7 μs, for example. The period t4 is 0.98 μs, for example.

As illustrated in FIG. 10, the detection device 1 executes the reset period Prst, the exposure periods Pex {(1), . . . , (M)}, and the read period Pdet described above in each of a period t(1), a period t(2), a period t(3), and a period t(4). In the reset period Prst and the read period Pdet, the gate line drive circuit 15 sequentially scans the gate lines from GCL(1) to GCL(M). In the following description, the term "detection for one frame" denotes the detection in each period t, that is, the detection in which the gate lines from GCL(1) to GCL(M) are scanned in the reset period Prst and the read period Pdet, and the detection signals Vdet are acquired from the signal lines SGL in the respective columns.

The control circuit 122 can control the lighting and the non-lighting of the light sources depending on the detection targets. FIG. 10 illustrates an example in which the first light sources 61 are on during the periods t(1) and t(3), and the second light sources 62 are on during the periods t(2) and t(4). That is, in the example illustrated in FIG. 10, the control circuit 122 alternately turns on and off the first light sources 61 and the second light sources 62 for each detection for one frame. The present disclosure is not limited to this example. For example, the control circuit 122 may turn on and off the first light sources 61 and the second light sources 62 at intervals of a predetermined period of time, or may successively turn on either of the first and the second light sources 61 and 62.

FIGS. 6 to 10 illustrate the example in which the gate line drive circuit 15 individually selects the gate line GCL, but the present disclosure is not limited to this example. The gate line drive circuit 15 may simultaneously select a predetermined number (two or more) of the gate lines GCL, and sequentially supply the gate drive signals Vgcl to the gate lines GCL in units of the predetermined number of the gate lines GCL. The signal line selection circuit 16 may also simultaneously couple a predetermined number (two or more) of the signal lines SGL to one detection circuit 48. Moreover, the gate line drive circuit 15 may scan some of the gate lines GCL while skipping the others.

As illustrated in FIG. 8, in the row read period VR(1), the selection signals ASW1, . . . , ASW6 are sequentially supplied to the signal line selection circuit 16 during the period in which the gate drive signal Vgcl(1) is at the high-level voltage (power supply voltage VDD). That is, even after the selection signal ASW1 is set to a low-level voltage at time t11, the exposure continues during an exposure period Pex-1 until the gate drive signal Vgcl(1) is set to the low-level voltage at time t13. The signal line SGL(1) corresponding to the selection signal ASW1 is charged with an electric charge corresponding to the exposure period Pex-1 from the optical sensor PD.

In the same manner, each of the signal lines SGL is charged with an electric charge during a corresponding one of exposure periods Pex-1, . . . , Pex-6 corresponding to the selection signals ASW1, . . . , ASW6, respectively. For example, the exposure period Pex-6 is a period after the selection signal ASW6 is set to the low-level voltage at time t12 until the gate drive signal Vgcl (1) is set to the low-level voltage at time t13. The exposure period Pex differs column by column.

In the next row read period VR(2), the detection circuit 48 is supplied with a signal obtained by adding an electric charge stored during the exposure periods Pex-1(SGL(1)), . . . , Pex-6(SGL(6)) of the previous row read period VR(1) to the detection signal Vdet of the second row.

As described above, the detection device 1 has the configuration including, for example, a plurality of types of light sources (first light sources 61 and second light sources 62) that emit light having different wave lengths, and thereby, can acquire the fingerprint acquired by detecting the light reflected on the surface of the finger Fg or the like and the various types of biometric information acquired by detecting the light reflected in or transmitted through the finger Fg or the like. The detection device 1 can change, for example, the frame rate and the definition based on the information to be acquired. In the case of performing the detection by setting detection conditions including the light sources that emit light to the optical sensors PD (or the wavelength of the light emitted to the optical sensors PD), the frame rate, and the definition based on the information to be acquired as described above, the data obtained after the signal processor 44 has processed the detection signals Vdet needs to be associated with the detection conditions when the detection signals Vdet are detected before the data is processed.

In the present disclosure, the data is associated with the detection conditions for the data by adding the detection conditions set based on the information to be acquired. Hereinafter, the detection conditions added to the data are referred to as "attribute information" of the data.

The following describes the embodiments illustrating specific examples of information acquired by the detection device 1.

First Embodiment

Figure 11:
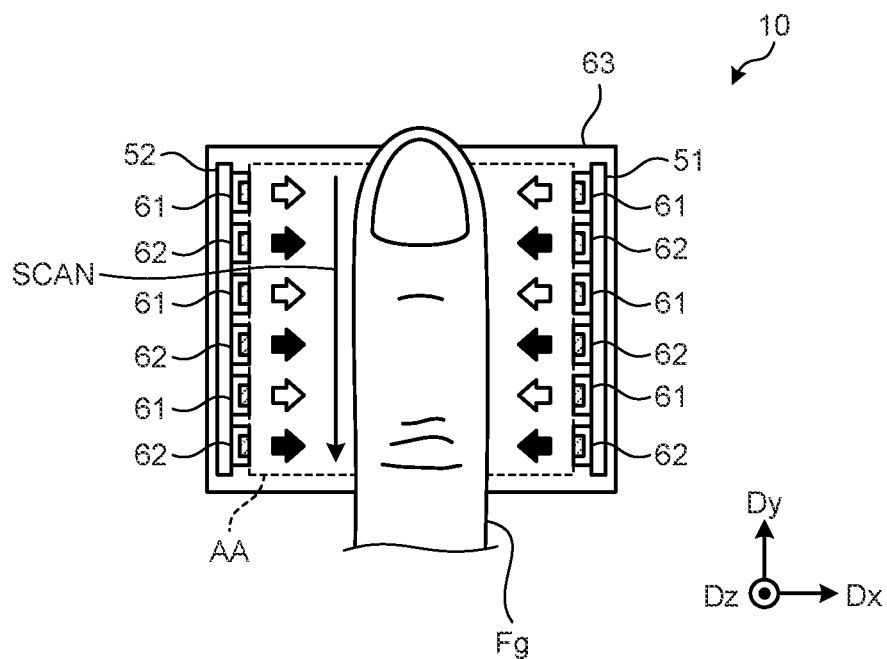
FIG. 11 is a plan view schematically illustrating a relation between the sensor, first light sources, and second light sources in the detection device according to a first embodiment.

As a first embodiment of the present disclosure, the following describes an example of removing noise components, such as body movement noise due to movement of the finger Fg, noise caused by the driving of the sensor and environmental noise due to disturbances or the like, from the acquired pulse waves. FIG. 11 is a plan view schematically illustrating a relation between the sensor, the first light sources, and the second light sources in the detection device according to the first embodiment.

As illustrated in FIG. 11, the detection device 1 includes a filter 63. The filter 63 is disposed so as to overlap the detection area AA from one end to the other end of the sensor 10 in a scan direction SCAN. The filter 63 has a transmission bandwidth for transmitting the first light emitted from the first light sources 61 and the second light emitted from the second light sources 62. In the configuration according to the first embodiment, the filter 63 is not required, and the configuration may exclude the filter 63.

In the configuration illustrated in FIG. 11, the scanning direction SCAN is the direction in which the gate line drive circuit 15 scans the gate line GCL. That is, one gate line GCL is provided so as to extend in the first direction Dx in the detection area AA and is coupled to the partial detection areas PAA provided in the detection area AA. One signal line SGL is provided so as to extend in the second direction Dy in the detection area AA and is coupled to the optical sensors PD in the detection area AA.

The first light source base member 51 and the second light source base member 52 face each other in the first direction Dx with the detection area AA interposed therebetween in the plan view. The first and the second light sources 61 and 62 are provided on a surface of the first light source base member 51 facing the second light source base member 52. The first and the second light sources 61 and 62 are also provided on a surface of the second light source base member 52 facing the first light source base member 51. The first and the second light sources 61 and 62 are arranged in the first direction Dx along the periphery of the detection area AA and are alternately provided in the second direction Dy on each of the first light source base member 51 and the second light source base member 52.

The first light sources 61 emit the first light in a direction parallel to the first direction Dx. As a result, the detection area AA is irradiated with the first light. The second light sources 62 emit the second light in the direction parallel to the first direction Dx. As a result, the detection area AA is irradiated with the second light.

In the first embodiment, the first light emitted from the first light sources 61 is, for example, red visible light (red light) with a wavelength of 600 nm to 700 nm, specifically approximately 660 nm. The first light emitted from the first light sources 61 may be, for example, infrared light with a wavelength of 780 nm to 950 nm, specifically, approximately 850 nm.

In the first embodiment, the second light emitted from the second light sources 62 is, for example, blue or green visible light (blue light or green light) with a wavelength of 520 nm to 600 nm, specifically, approximately 550 nm.

In the present embodiment, the pulse waves are acquired with the first light (red light or infrared light) emitted from the first light sources 61, and the noise component is acquired with the second light (blue light or green light) emitted from the second light sources 62.

Figure 12:
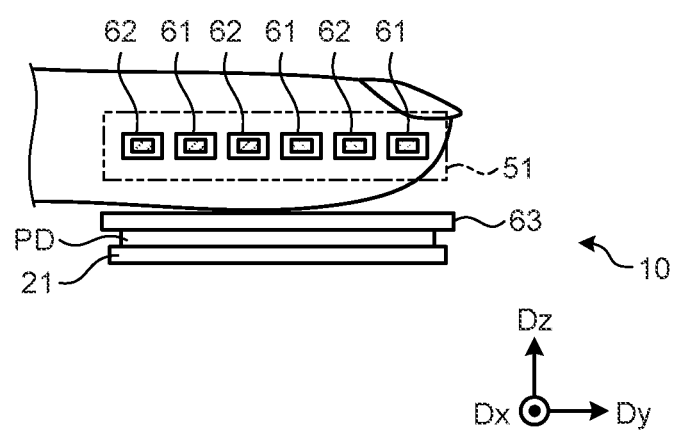
FIG. 12 is a side view of the detection device illustrated in FIG. 11 as viewed in a first direction Dx.

FIG. 12 is a side view of the detection device illustrated in FIG. 11 as viewed from the first direction Dx. As illustrated in FIG. 12, an object to be detected such as a finger Fg comes in contact with or in proximity to the top of the sensor 10 with the filter 63 interposed therebetween. The first and the second light sources 61 and 62 are arranged above the sensor 10 and the filter 63 and are arranged with the object to be detected such as a finger Fg interposed therebetween in the first direction Dx.

The first light emitted from the first light sources 61 travels parallel to the first direction Dx and enters the finger Fg. The first light, which is the red light with a wavelength of 600 nm to 700 nm or the infrared light with a wavelength of 780 nm to 950 nm, penetrates into the living body and is reflected in the finger Fg. The reflected light reflected in the finger Fg travels in the third direction Dz and enters the detection area AA of the sensor 10 through the filter 63.

The second light emitted from the second light sources 62 travels in the direction parallel to the first direction Dx and enters the finger Fg. The second light, which is the blue light or green light with a wavelength of 520 nm to 600 nm, shallowly penetrates into the living body and is mostly reflected on the surface of the finger Fg. The reflected light reflected on the surface of the finger Fg travels in the third direction Dz and enters the detection area AA of the sensor 10 through the filter 63.

In the first embodiment, the arrangement of the first and the second light sources 61 and 62 is not limited to the example illustrated in FIGS. 11 and 12. For example, in an aspect, the first and the second light may be emitted from above the object to be detected such as the finger Fg illustrated in FIG. 12, specifically, in the third direction Dz. Alternatively, the first and the second light sources 61 and 62 may be, for example, what are called direct-type light sources provided directly below the detection area AA.

In the first embodiment, the detection is performed in the second mode in which the detection is performed at the higher frame rate and the lower definition in order to acquire the pulse waves.

In the first embodiment, as illustrated in FIG. 10, the reset period Prst, the exposure period Pex, and the read period Pdet are provided in the detection for one frame in each of the periods t(1), t(2), t(3), and t(4). In the reset period Prst and the read period Pdet, the gate line drive circuit 15 sequentially scans the gate lines from GCL(1) to GCL(M).

As illustrated in FIG. 10, in the detection for one frame in the period t(1), the control circuit 122 (detection controller 11) causes the first light sources 61 to be on and the second light sources 62 to be off during the exposure period Pex. Thus, the detection device 1 uses the first light emitted from the first light sources 61 to perform the detection in the second mode in which the detection is performed at the higher frame rate and the lower definition. In the detection for one frame in the period t(2), the control circuit 122 (detection controller 11) causes the first light sources 61 to be off and the second light sources 62 to be on during the exposure period Pex. Thus, the detection device 1 uses the first light emitted from the second light sources 62 to perform the detection in the second mode in which the detection is performed at the higher frame rate and the lower definition. That is, in the first embodiment, the detection device 1 performs the detection in the second mode in which the detection is performed at the higher frame rate and the lower definition both in the detection based on the first light emitted from the first light sources 61 and the detection based on the first light emitted from the second light sources 62. In the same manner, the first light sources 61 are controlled to be on and the second light sources 62 are controlled to be off during the exposure period Pex in the detection for one frame in the period t(3), and the first light sources 61 are controlled to be off and the second light sources 62 are controlled to be on during the exposure period Pex in the detection for one frame in the period t(4).

Thus, the first and the second light sources 61 and 62 are controlled to be on and off in a time-division manner for each detection operation for one frame. As a result, a first detection signal detected by the optical sensor PD based on the first light and a second detection signal detected by the optical sensor PD based on the second light are output to the detection circuit 48 in a time-division manner.

The detection circuit 48 processes each of the first and the second detection signals on a time-series basis and outputs the result to the control circuit 122 (signal processor 44).

The pulse waves can be acquired from the signal detected using the reflected light reflected in the finger Fg in the second mode in which the detection is performed at the higher frame rate and the lower definition. That is, the pulse waves can be acquired from the first signal detected in the periods t(1), t(3), . . . . The first detection signal contains the body movement noise due to the movement of the finger Fg.

This body movement noise can be acquired from the signal detected using the reflected light reflected on the surface of the finger Fg also in the second mode. That is, the body movement noise can be acquired from the second detection signal detected in the periods t(2), t(4), . . . .

In the first embodiment, as the biometric information acquisition process, the host 200 cancels the body movement noise by adjusting the processed data of the first detection signal detected in the periods t(1), t(3), . . . , based on the processed data of the second detection signal detected in the periods t(2), t(4), . . . .

Specifically, the host 200 subtracts the processed data of the second detection signal detected in the period t(2) (second data) from the processed data of the first detection signal detected in the period t(1) (first data). In the same manner, the host 200 subtracts the processed data of the second detection signal (second data) detected in the period t(4) from the processed data of the first detection signal (first data) detected in the period t(3). By subsequently performing the same processing, the pulse waves with the body movement noise removed can be acquired.

Figure 13:
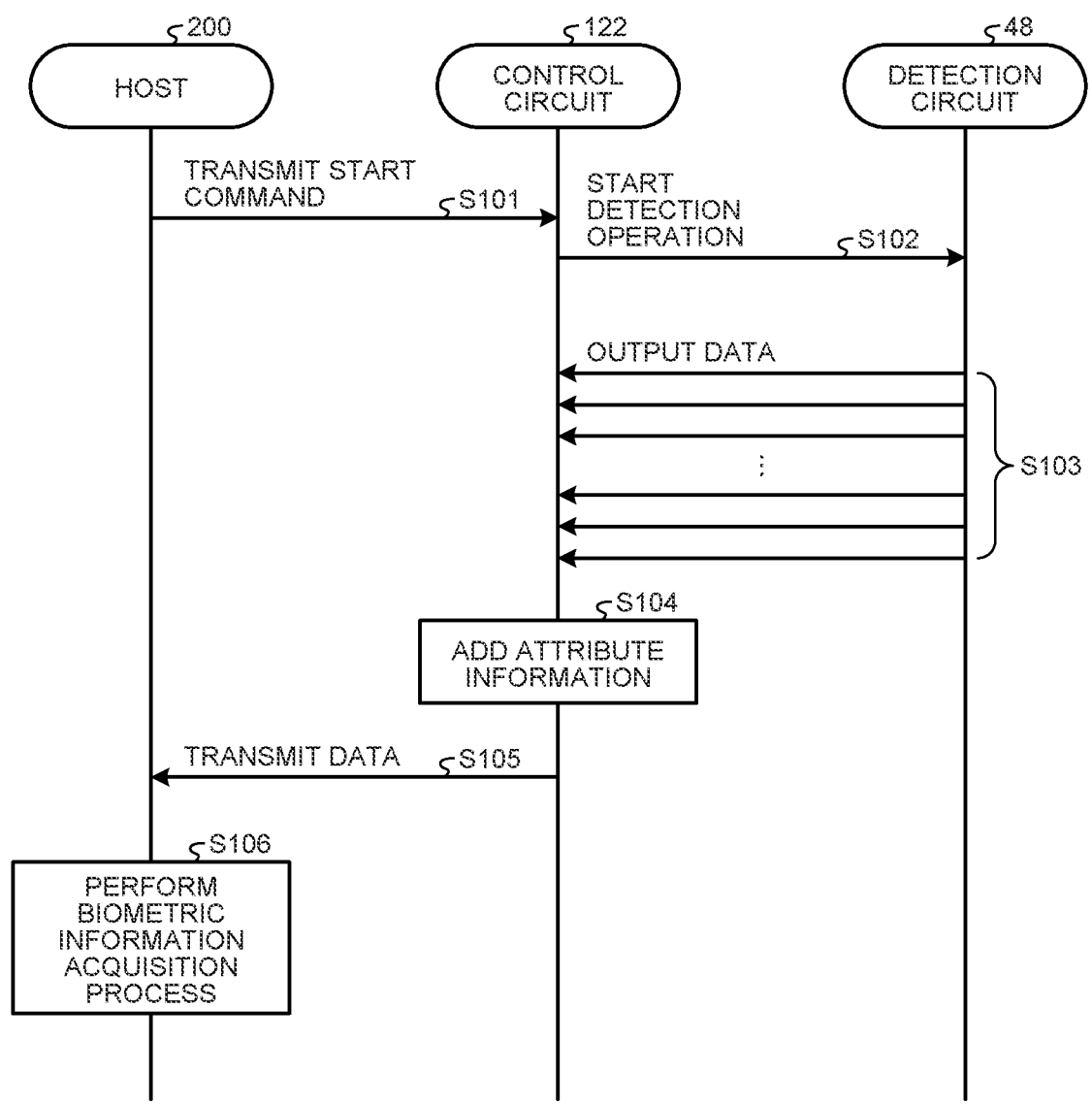
FIG. 13 is a sequence diagram illustrating a specific example of a detection process of the detection device according to the first embodiment.

FIG. 13 is a sequence diagram illustrating a specific example of a detection process of the detection device according to the first embodiment.

As illustrated in FIG. 13, the host 200 transmits a start command to the detection device 1 to request the detection device 1 to start the detection (Step S101)

The start command contains control information for acquiring the fingerprint or the biometric information. Examples of the control information for acquiring the fingerprint or the biometric information include frame rate control information, definition control information, and light source control information. In the first embodiment, the frame rate control information includes at least information indicating that the detection is performed at the higher frame rate (at, for example, 100 fps or higher). In the first embodiment, the definition control information includes at least information indicating that the detection is performed at the lower definition (at, for example, 50 ppi or lower). In the first embodiment, the light source control information includes, for example, information indicating that: in odd-numbered frames, the first light sources 61 is on and the second light sources 62 is off; and in even-numbered frames, the first light sources 61 is off and the second light sources 62 is on.

After receiving the start command from the host 200 through the output circuit 126, the control circuit 122 supplies control signals in accordance with the control information contained in the start command to the sensor the gate line drive circuit 15, the signal line selection circuit 16, the first light sources 61, and the second light sources 62 to start the detection operation (Step S102).

The detection circuit 48 adds, to the head of data to be output, the header information indicating the frame number of the frame to which the data belongs, and outputs the data to the signal processor 44 (Step S103). The data output from the detection circuit 48 may be configured as, for example, one frame of data made up of a plurality of pieces of data. In this case, the header information is added, which indicates both the frame number of the frame to which each piece of data belongs and the data number of the piece of data in the frame.

Figure 14:
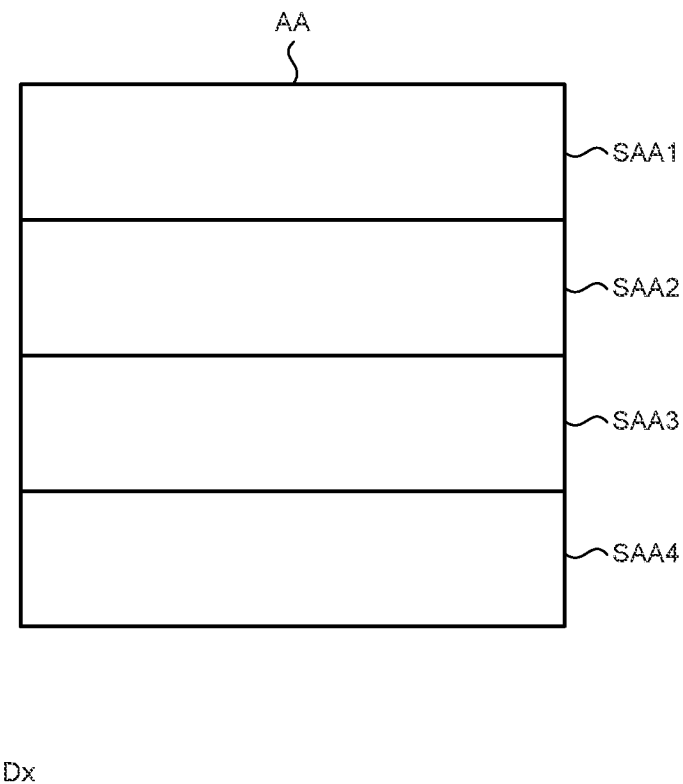
FIG. 14 is a diagram illustrating a division example of a detection area when one frame of data is made up of a plurality of pieces of data.
Figure 15:
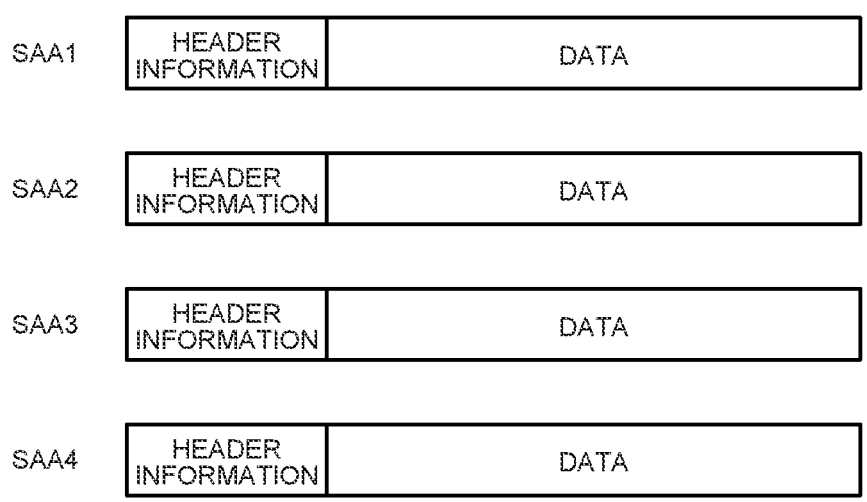
FIG. 15 is a diagram illustrating an example in which header information is added.

FIG. 14 is a diagram illustrating a division example of the detection area when one frame of data is made up of a plurality of pieces of data. FIG. 15 is a diagram illustrating an example in which the header information is added. FIG. 14 illustrates the example in which the detection area AA is divided into four sub-areas SAA1, SAA2, SAA3, and SAA4 in the second direction Dy. In this case, as illustrated in FIG. 15, the detection circuit 48 adds, to the head of each of the pieces of the data for the sub-areas SAA1, SAA2, SAA3, and SAA4, the header information indicating the frame number of the frame to which the piece of data belongs and the data number of the piece of data in the frame; and outputs the data to the signal processor 44.

If the control circuit 122 knows the frame number of the frame to which each of the pieces of data output from the detection circuit 48 belongs, or the data number of the piece of data in the frame, the header information need not be added.

The signal processor 44 sequentially stores and holds each piece of the data output from the detection circuit 48 in the storage 46. At this time, the signal processor 44 adds the attribute information on the data for a plurality of frames to the head of the data for the plurality of frames, based on at least the control information contained in the start command (Step S104). Alternatively, if the header information is added to the data output from the detection circuit 48, the signal processor 44 outputs the detection information data with the attribute information on the data for the plurality of frames added to the head of the data for the frames, based on the header information added to each piece of the data output from the detection circuit 48 and the control information contained in the start command.

In the first embodiment, the attribute information added to the data for the plurality of frames includes at least light source information indicating that the data for the odd-numbered frames is the data (first data) with the first light sources 61 on and the second light sources 62 off and the data for the even-numbered frames is the data (second data) with the first light sources 61 off and the second light sources 62 on. Alternatively, in an aspect, if the control circuit 122 knows that the first light sources 61 and the second light sources 62 are alternately switched between on and off for each detection operation for one frame, the light source information included in the attribute information may include at least information indicating which of the first light sources 61 and the second light sources 62 are the light sources turned on to acquire the data for the first one frame of the plurality of frames, or in other words, which of the first light and the second light is the light emitted to acquire the data.

The signal processor 44 reads the data for the plurality of frames held in the storage 46 and transmits the read data to the host 200 through the output circuit 126 (Step S105).

Figure 16:
FIG. 16 is a diagram illustrating an exemplary data format of detection information data output from the detection device.

FIG. 16 is a diagram illustrating an exemplary data format of the detection information data output from the detection device. As illustrated in FIG. 16, in the detection information data output from the detection device, the attribute information on the data for a plurality of frames (in this case, from Frame 1 to Frame N) is added to the head of the data for the plurality of frames.

FIG. 17 is a chart illustrating a detailed specific example of the data format illustrated in FIG. 16.

In FIG. 17, all "1" as header marks in the FPGA header category each indicate a header start mark. Frame numbers Seq1, Seq2, . . . , Seq12 indicate frame count numbers and are counted up for each frame. Reserved areas represent user-settable areas. For example, lighting information on the light sources (for the blue or green light, the red light, or the infrared light) is added to the reserved areas.

AFE headers 1, 2, . . . , 16 in the AFE header category are headers added by the detection circuit 48 and are areas in which register setting information is stored.

In the frame data category, 16 bits of raw data for one address are delimited by every 8 bits. Raw9, Raw10, . . . , Raw16 are each defined as a unit data MSB (most significant bit). Raw1, Raw2, . . . , Raw8 are each defined as a unit data LSB (least significant bit).

ALL "0" in the footer marker of the FPGA footer category indicates the start of the footer, and seq1, 2, . . . , 12 in the Frame number is counted up for each face number.

In the first embodiment, as described above, the attribute information on the data for each frame includes at least the light source information indicating that the data for the odd-numbered frames (first data) is the data with the first light sources 61 on and the second light sources 62 off and the data for the even-numbered frames (second data) is the data with the first light sources 61 off and the second light sources 62 on. Alternatively, if the control circuit 122 knows that the first light sources 61 and the second light sources 62 are alternately switched between on and off for each detection operation for one frame, the light source information included in the attribute information includes at least information indicating which of the first light sources 61 and the second light sources 62 are the light sources turned on to acquire the data for the first one frame of the plurality of frames, or which of the first light and the second light is the light emitted to acquire the data. As a result, the data for each frame can be associated with information indicating which light sources have emitted light to acquire the data.

The host 200 performs the predetermined biometric information acquisition process based on the detection information data transmitted from the detection device 1 (Step S106). Specifically, in the first embodiment, the host 200 reads the attribute information added to the data for the plurality of frames transmitted from the detection device 1, and corrects the data for the odd-numbered frames (first data) based on the data for the even-numbered frames (second data). As a result, the pulse waves from which the body movement noise has been removed can be acquired.

Second Embodiment

As a second embodiment of the present disclosure, the following describes an example of acquiring the pulse waves as the biometric information for calculating a blood oxygen saturation level. In the second embodiment, the wavelength of the first light emitted from the first light sources 61 and the wavelength of the second light emitted from the second light sources 62 differ from those in the first embodiment.

In the case of acquiring the human blood oxygen saturation level, for example, the visible light (red light) with a wavelength of 600 nm to 700 nm, specifically, approximately 660 nm is employed as the first light emitted from the first light sources 61, and the infrared light with a wavelength of 780 nm to 950 nm, specifically, approximately 850 nm is employed as the second light emitted from the second light sources 62. In the second embodiment, the pulse waves acquired using the first light and the pulse waves acquired using the second light are used.

Since the amount of light absorption changes with an amount of oxygen taken up by hemoglobin, the optical sensor PD detects an amount of light obtained by subtracting the amount of light absorbed by the blood (hemoglobin) from that of each of the first light and the second light that have been emitted. Most of the oxygen in the blood is reversibly bound to hemoglobin in red blood cells, and a small portion of the oxygen is dissolved in blood plasma. More specifically, the value of percentage of the bound oxygen with respect to an allowable amount thereof in the blood as a whole is called the oxygen saturation level ($SpO_2$). The blood oxygen saturation level can be calculated from the amount of light obtained by subtracting the amount of light absorbed by the blood (hemoglobin) from that of the light emitted at the two wavelengths of the first light and the second light.

The oxygen saturation level ($SpO_2$) is determined by the ratio of hemoglobin in blood bound to oxygen (oxygenated hemoglobin ($O_2Hb$)) to hemoglobin in blood not bound to oxygen (reduced hemoglobin (HHb)). The light absorption characteristics of the red light are represented as HHb»$O_2$Hb, indicating that HHb has significantly larger absorbance, while the light absorption characteristics of the infrared light are represented as HHb≈$O_2$Hb, indicating that $O_2$Hb has slightly larger absorbance.

In the second embodiment, in order to acquire the pulse waves, the detection is performed in the second mode of performing the detection at the higher frame rate and the lower definition in both the detection using the first light emitted from the first light sources 61 and the detection using the first light emitted from the second light sources 62. Since the calculation of the blood oxygen saturation level uses the pulse waves acquired using the first light and the pulse waves acquired using the second light as described above, the detection timing gap between the first detection signal detected based on the first light and the second detection signal detected based on the second light is preferably smaller.

Figure 18:
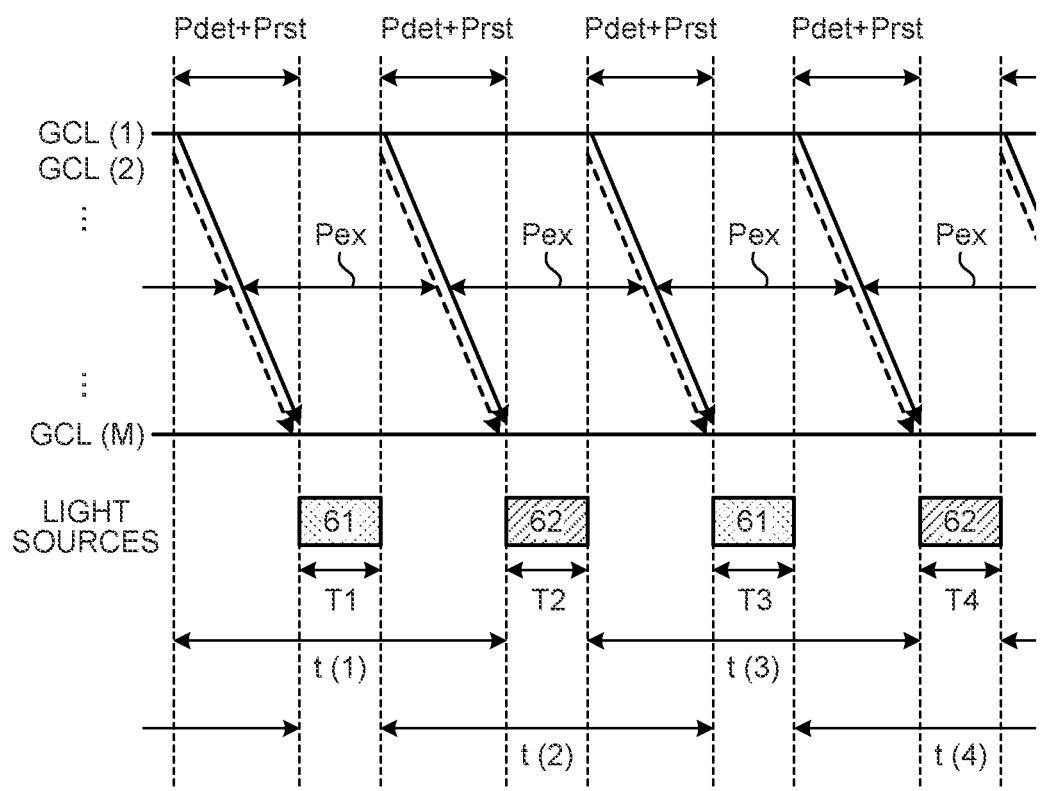
FIG. 18 is an explanatory diagram for explaining an operation example of the detection device according to a second embodiment.
Figure 19:
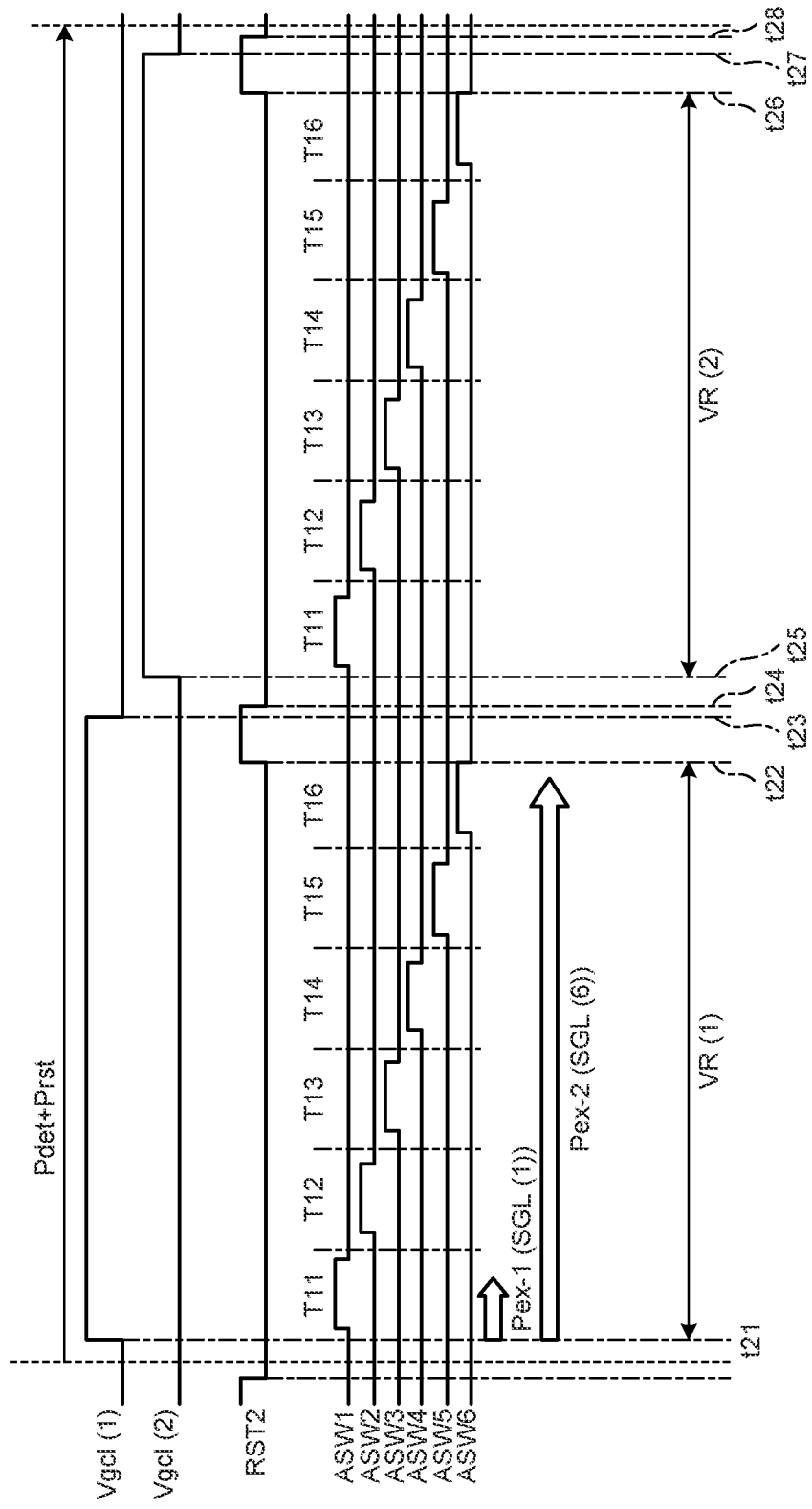
FIG. 19 is a timing waveform chart illustrating an operation example of the detection device according to the second embodiment.

FIG. 18 is an explanatory diagram for explaining an operation example of the detection device according to the second embodiment. FIG. 19 is a timing waveform chart illustrating an operation example of the detection device according to the second embodiment. FIG. 18 indicates the reset period Prst with a solid arrow and the read period Pdet with a dashed arrow for each of the periods t(1), t(2), t(3), and t(4).

In the second embodiment, as illustrated in FIG. 18, the reset period Prst of the period t(1) provided with the period T1 to turn on the first light sources 61 is provided in parallel with the read period Pdet of the previous frame. The reset period Prst of the period t(2) provided with the period T2 to turn on the second light sources 62 is provided in parallel with the read period Pdet of the previous frame. Subsequently, in the same manner, the reset period Prst of the period t(3) provided with the period T3 to turn on the first light sources 61 is provided in parallel with the read period Pdet of the previous frame, and the reset period Prst of the period t(4) provided with the period T4 to turn on the second light sources 62 is provided in parallel with the read period Pdet of the previous frame. Specifically, for example, immediately after each row of the frame for the period t(1) is read, the row of the frame for the period t(2) is reset and light is emitted during the period T2. Then, immediately after each row of the frame for the period t(2) is read, the row of the frame for the period t(3) is reset and light is emitted during the period T3. Subsequently, the same operation is repeated. This operation can reduce the detection timing gap between the detection based on the first light emitted from the first light sources 61 and the detection based on the first light emitted from the second light sources 62 in each row.

In the second embodiment, the gate drive signal Vgcl is supplied to the gate lines GCL row by row, and the first switching elements Tr belonging to a certain row are brought into a coupled state. Specifically, as illustrated in FIG. 19, the gate line drive circuit 15 supplies the gate drive signal Vgcl(1) at the high-level voltage (power supply voltage VDD) to the gate line GCL(1) at time t21. The row read period VR(1) starts at time t21 when the gate drive signal Vgcl(1) is set to the high-level voltage.

Specifically, the control circuit 122 sequentially supplies the selection signals ASW1, . . . , ASW6 to the signal line selection circuit 16 during a period in which the gate drive signal Vgcl(1) is at the high-level voltage (power supply voltage VDD). The third switching elements TrS are sequentially brought into the coupled state in response to the selection signals ASW1, . . . , ASW6. That is, during the period of reading each row (row read period VR(1)), when the first switching elements Tr of the certain row are in the coupled state, the signal line selection circuit 16 couples the signal lines SGL to the detection circuit 48 column by column in a predetermined order. As a result, the detection signal Vdet for each of the partial detection areas PAA is supplied to the detection circuit 48.

In FIG. 19, the selection signals ASW1, . . . , ASW6 are supplied in the order of periods T11, . . . , T16 in a time-division manner. At time t22, the control circuit 122 sets the selection signal ASW6 to the low-level voltage, and the reading of the last column ends. That is, in the present embodiment, the row read period VR(1) ends when the gate drive signal Vgcl(1) is at the high-level voltage and the selection signal ASW6 has changed to the low-level voltage.

After the completion of the read period of the certain row (row read period VR(1)) and before the start of the read period of a row next to the certain row (row read period VR(2)), a reset potential (reference signal COM) is supplied to the optical sensors PD and the signal lines SGL belonging to the certain row. Specifically, the control circuit 122 supplies the reset signal RST2 to the reset signal line Lrst at time t22. This operation turns on the fourth switching elements TrR to supply the reference signal COM to the optical sensors PD and the signal lines SGL corresponding to the gate line GCL(1).

In FIG. 19, the time when the reset signal RST2 is set to the high-level voltage coincides with the time when the selection signal ASW6 is set to the low-level voltage, at time t22. However, the timing is not limited thereto. The reset signal RST2 may be set to the high-level voltage after a predetermined period of time has elapsed since the selection signal ASW6 has been set to the low-level voltage.

Then, at time t23, the gate line drive circuit 15 sets the gate drive signal Vgcl(1) to the low-level voltage. This operation brings the first switching elements Tr of the certain row into a non-coupled state. At time t24, the control circuit 122 sets the reset signal RST2 to the low-level voltage. This operation ends the read period Pdet and the reset period Prst of the first row.

Then, at time t25, the gate line drive circuit 15 supplies the gate drive signal Vgcl(2) at the high-level voltage (power supply voltage VDD) to the gate line GCL(2) of the second row. Subsequently, in the same manner as in the first row, the read period Pdet and the reset period Prst of the second row are provided from time t26 to time t28. The detection for one frame can be performed by repeating the scanning operation described above to the last row (gate line GCL(256)).

During the periods T1, T2, T3, and T4 (FIG. 18) in which the light sources are controlled to be on, none of the gate lines GCL is selected (the gate drive signals Vgcl are at the low-level voltage). That is, the light sources are off during the row read period VR in which the first switching elements Tr in the certain row are in the coupled state, and the light sources are on during the periods T1, T2, T3, and T4 in which all the first switching elements Tr are in the non-coupled state.

In the second embodiment, the host 200 reads the attribute information of the detection information data transmitted from the detection device 1 at Step S106 of the detection process (refer to FIG. 13) described in the first embodiment, and calculates the blood oxygen saturation level using the pulse waves acquired based on the data for the odd-numbered frames (first data) and the pulse waves acquired based on the data for the even-numbered frames (second data). In the second embodiment, as described above, the read period Pdet and the reset period Prst in the detection of two frames before and after each other are provided in parallel. Therefore, the detection timing gap between the first detection signal detected based on the first light and the second detection signal detected based on the second light can be reduced.

Third Embodiment

Figure 20:
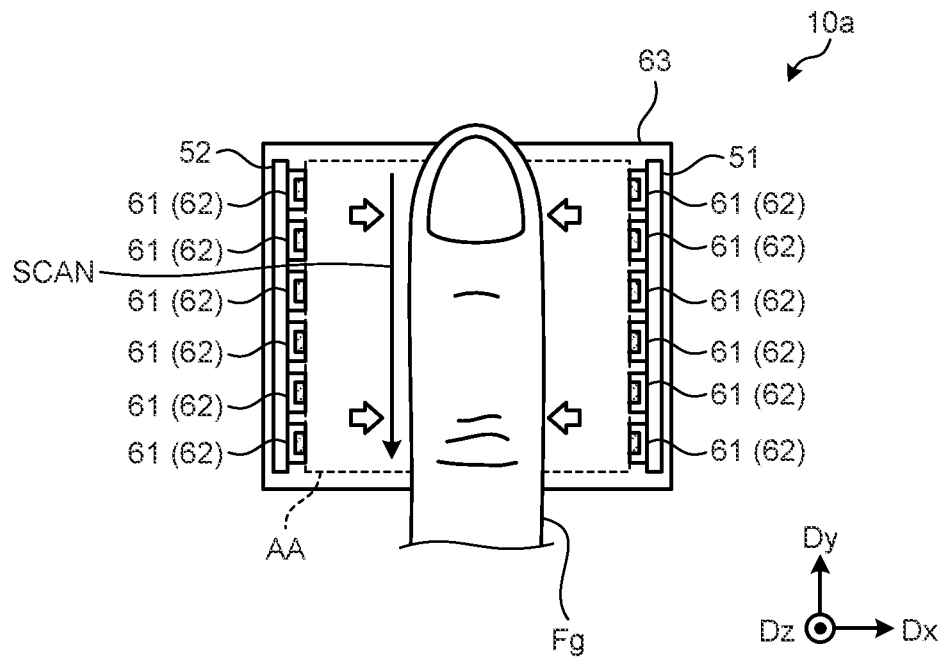
FIG. 20 is a plan view schematically illustrating a relation between a sensor and the light sources of a detection device according to a third embodiment.

As a third embodiment of the present disclosure, the following describes an example of acquiring the vascular pattern of the veins and the like and the pulse waves. FIG. 20 is a plan view schematically illustrating a relation between a sensor and the light sources of a detection device according to the third embodiment.

In the third embodiment, no distinction is made between the first light sources 61 and the second light sources 62, and both light sources emit light of the same wavelength in the direction parallel to the first direction Dx. In the following description, the first and the second light sources 61 and 62 are referred to as light sources 61 (62). In the third embodiment, the red visible light (red light) with a wavelength of 600 nm to 700 nm, specifically, approximately 660 nm is employed as the light emitted from the light sources 61 (62). Alternatively, in an aspect, the infrared light with a wavelength of 780 nm to 950 nm, specifically, approximately 850 nm may be employed as the light emitted from the light sources 61 (62).

In the third embodiment, the vascular pattern of the veins and the like is acquired in the detection of the odd-numbered frames, and the pulse waves are acquired in the detection of the even-numbered frames. Specifically, a sensor 10a illustrated in FIG. 20, for example, performs detection in the third mode of performing the detection at the medium frame rate and the medium definition in the detection of the odd-numbered frames to detect the vascular pattern of the veins and the like, and performs detection in the second mode of performing the detection at the higher frame rate and the lower definition in the detection of the even-numbered frames to detect the pulse waves. Therefore, in the third embodiment, the control information included in the start command transmitted from the host 200 at Step S101 of the detection process (refer to FIG. 13) described in the first embodiment includes, for example, the frame rate control information and the definition control information. In the third embodiment, the frame rate control information includes information indicating that the detection is performed at the medium frame rate (for example, higher than 20 fps and lower than 100 fps) for the odd-numbered frames and the detection is performed at the higher frame rate (in this case, at, for example, 1000 fps or higher) for the even-numbered frames. In the third embodiment, the definition control information includes information indicating that the detection is performed at the medium definition (for example, higher than 50 ppi and lower than 300 ppi) for the odd-numbered frames and the detection is performed at the lower definition (at, for example, 50 ppi or lower) for the even-numbered frames.

In the third embodiment, the attribute information added to the data for the plurality of frames at Step S104 of the detection process (refer to FIG. 13) described in the first embodiment includes at least frame rate information and definition information. The frame rate information includes the fact that the data acquired in the odd-numbered frames (first data) is data detected at the medium frame rate (for example, higher than 20 fps and lower than 100 fps) and the data acquired in the even-numbered frames (second data) is data detected at the higher frame rate (in this case, at, for example, 1000 fps or higher). The definition information includes the fact that the data acquired in the odd-numbered frames (first data) is data detected at the medium definition (for example, higher than 50 ppi and lower than 300 ppi) and the data acquired in the even-numbered frames (second data) is data detected at the lower definition (at, for example, 50 ppi or lower). Alternatively, in an aspect, if the control circuit 122 knows that the frame rate is alternately switched between the medium frame rate and the higher frame rate for each detection operation for one frame, the frame rate information included in the attribute information may include at least information indicating which of the medium frame rate and the higher frame rate is the frame rate used to acquire data for the first frame among pieces of data for the plurality of frames. In an aspect, if the control circuit 122 knows that the frame rate is alternately switched between the medium definition and the lower definition for each detection operation for one frame, the definition information included in the attribute information may include at least information indicating which of the medium definition and the lower definition is the definition used to acquire the data for the first frame among pieces of data for the plurality of frames.

Then, at Step S106, the host 200 reads the attribute information of the detection information data transmitted from the detection device 1, detects the vascular pattern of the veins and the like based on the data acquired in the odd-numbered frames (first data), and detects the pulse waves based on the data acquired in the even-numbered frames (second data). The pulse waves can be acquired using the data detected in the third mode of performing the detection at the medium frame rate and the medium definition. However, as described above, the calculation of the pulse wave velocity and the calculation of the blood pressure and the like are enabled by acquiring the pulse waves using the data detected in the second mode of performing the detection at the higher frame rate and the lower definition. As a result, the detection of the vascular pattern of the veins and the like and the detection of the pulse waves enabling the calculation of the pulse wave velocity and the calculation of the blood pressure and the like can be simultaneously performed.

Fourth Embodiment

Figure 21:
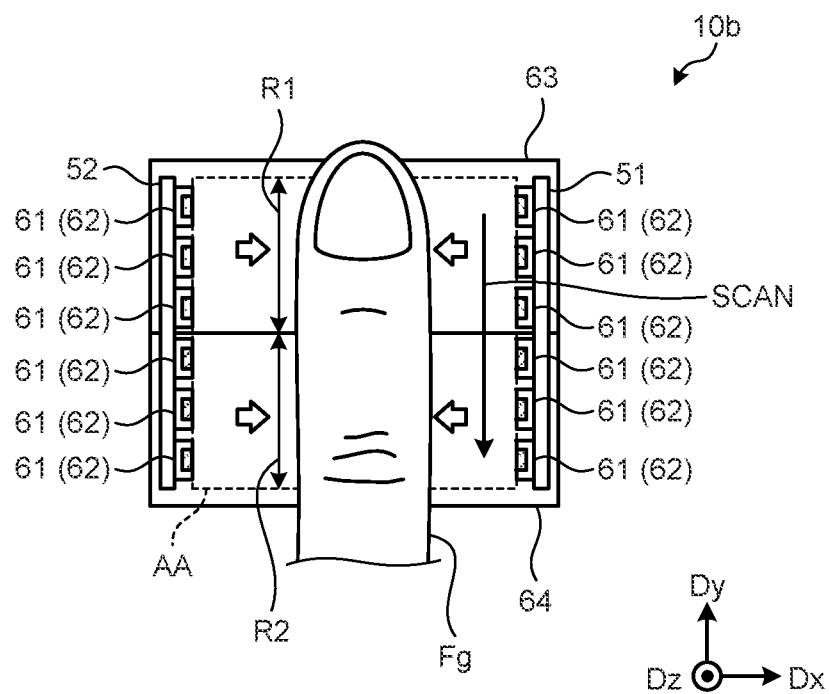
FIG. 21 is a plan view schematically illustrating a relation between a sensor and the light sources of a detection device according to a fourth embodiment.

As a fourth embodiment of the present disclosure, the following describes an example in which the detection area AA is divided into a plurality of areas and different biometric information is acquired in each of the areas. FIG. 21 is a plan view schematically illustrating a relation between a sensor and the light sources of a detection device according to the fourth embodiment.

In the fourth embodiment, the detection area AA is divided into two areas of a first divided detection area R1 and a second divided detection area R2 that are adjacent to each other in the second direction Dy, as illustrated in FIG. 21. The detection device 1 includes a first filter 63 and a second filter 64. The first filter 63 is disposed so as to overlap the first divided detection area R1. The second filter 64 is disposed so as to overlap the second divided detection area R2. The first filter 63 and the second filter 64 are adjacent to each other in the scan direction SCAN (second direction Dy). In the configuration according to the fourth embodiment, the first filter 63 and the second filter 64 may be the same filter.

Each of the gate lines GCL is provided in one of the first and the second divided detection areas R1 and R2 and is coupled to the optical sensors PD in the first divided detection area R1 or the optical sensors PD in the second divided detection area R2. Each of the signal lines SGL is provided across the first and the second divided detection areas R1 and R2 and is coupled to the partial detection areas PAA provided in the first and the second divided detection areas R1 and R2.

The first light source base member 51 faces the second light source base member 52 in the first direction Dx with a sensor 10b interposed therebetween in the plan view. The first light sources 61 or the second light sources 62 are provided on a surface of the first light source base member 51 facing the second light source base member 52. The first light sources 61 or the second light sources 62 are also provided on a surface of the second light source base member 52 facing the first light source base member 51.

In the fourth embodiment, in the same manner as in the third embodiment, no distinction is made between the first light sources 61 and the second light sources 62, and both light sources emit light of the same wavelength (red visible light (red light) with a wavelength of 600 nm to 700 nm, specifically, approximately 660 nm, or infrared light with a wavelength of 780 nm to 950 nm, specifically, approximately 850 nm) in the direction parallel to the first direction Dx. In the following description, the first and the second light sources 61 and 62 are referred to as the light sources 61 (62).

In the fourth embodiment, the sensor 10b illustrated in FIG. 21 detects the fingerprint of the finger Fg in the first divided detection area R1 and detects the pulse waves and the vascular pattern of the veins and the like in the second divided detection area R2. In order to acquire the fingerprint of the finger Fg at the higher definition, at least the first filter 63 disposed so as to overlap the first divided detection area R1 employs, for example, an optical film (such as a collimator film) that transmits straight light parallel to the third direction Dz. In an aspect, the second filter 64 disposed so as to overlap the second divided detection area R2 may employ, for example, an optical film (such as a louver film) having a wider light transmission range than that of the first filter 63.

In the fourth embodiment, the detection is performed in the first mode of performing the detection at the lower frame rate and the higher definition in the first divided detection area R1 for detecting the fingerprint of the finger Fg, and the detection is performed in the third mode of performing the detection at the medium frame rate and the medium definition in the second divided detection area R2 for detecting the pulse waves and the vascular pattern of the veins and the like. Therefore, in the fourth embodiment, the control information included in the start command transmitted from the host 200 at Step S101 of the detection process (refer to FIG. 13) described in the first embodiment includes, for example, the frame rate control information and the definition control information. In the fourth embodiment, the frame rate control information includes information indicating that the detection is performed at the lower frame rate (for example, 20 fps or lower) in the first divided detection area R1 and the detection is performed at the medium frame rate (for example, higher than 20 fps and lower than 100 fps) in the second divided detection area R2. In the fourth embodiment, the definition control information includes information indicating that the detection is performed at the higher definition (for example, at 300 ppi or higher) in the first divided detection area R1 and the detection is performed at the medium definition (for example, higher than 50 ppi and lower than 300 ppi) in the second divided detection area R2. In the fourth embodiment, when an optical film (such as a louver film) having a wider light transmission range than that of the first filter 63 is employed as the second filter 64, the detection at the higher definition can be performed in the first divided detection area R1 provided with the first filter 63 and the detection at the lower definition than in the first divided detection area R1 can be performed in the second divided detection area R2 provided with the second filter 64. In this case, in an aspect, the control information included in the start command transmitted from the host 200 need not include the definition control information.

In the fourth embodiment, the attribute information added to the data for the plurality of frames at Step S104 of the detection process (refer to FIG. 13) described in the first embodiment includes at least the frame rate information and the definition information. The frame rate information includes the fact that the data acquired in the first divided detection area R1 (first data) is the data detected at the lower frame rate (for example, 20 fps or lower) and the data acquired in the second divided detection area R2 (second data) is the data detected at the medium frame rate (for example, higher than 20 fps and lower than 100 fps). The definition information includes the fact that the data acquired in the first divided detection area R1 (first data) is the data detected at the higher definition (for example, at 300 ppi or higher) and the data acquired in the second divided detection area R2 (second data) is the data detected at the medium definition (for example, higher than 50 ppi and lower than 300 ppi). In the fourth embodiment, in an aspect, the attribute information may be added to the head of each frame of data. In the fourth embodiment, when an optical film (such as a louver film) having a wider light transmission range than that of the first filter 63 is employed as the second filter 64, the detection at the higher definition can be performed in the first divided detection area R1 provided with the first filter 63 and the detection at the lower definition than in the first divided detection area R1 can be performed in the second divided detection area R2 provided with the second filter 64, as described above. In this case, in an aspect, the attribute information on the detection information data transmitted from the detection device 1 need not include the definition information.

At Step S106, the host 200 reads the attribute information of the detection information data transmitted from the detection device 1, detects the fingerprint of the finger Fg based on the data acquired in the first divided detection area R1 (first data), and detects the pulse waves and the vascular pattern of the veins and the like based on the data acquired in the second divided detection area R2 (second data). As a result, the detection of the fingerprint of the finger Fg and the detection of the pulse waves and the vascular pattern of the veins and the like can be simultaneously performed.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A detection device comprising:
   a plurality of optical sensors that are arranged in a detection area and each of which is configured to output a signal corresponding to light irradiating the optical sensor;
   a detection circuit configured to be supplied with the signals from the optical sensors; and
   a control circuit configured to output first data and second data for which detection conditions for acquiring the signals differ from each other, wherein
   the control circuit is configured to output detection information data in which the detection conditions for the first data and the detection conditions for the second data are added as attribute information to a head of a data string in which the first data and the second data are sequentially arranged,
   the first data and the second data are acquired in the detection area at different frame rates from each other,
   one of the first data and the second data is acquired at a first frame rate,
   the other of the first data and the second data is acquired at a second frame rate different from the first frame rate, and
   the attribute information includes at least frame rate information that indicates which of the first frame rate or the second frame rate is the frame rate used to acquire the first data.

2. The detection device according to claim 1, further comprising:
   a first light source configured to emit first light to the detection area; and
   a second light source configured to emit second light having a different wavelength from that of the first light to the detection area, wherein
   one of the first data and the second data is acquired by emitting the first light,
   the other of the first data and the second data is acquired by emitting the second light, and
   the attribute information includes at least light source information indicating which of the first light and the second light is the light emitted to acquire the first data.

3. The detection device according to claim 2, wherein the first light or the second light is infrared light or red light.

4. The detection device according to claim 2, wherein the first light or the second light is blue light or green light.

5. The detection device according to claim 2, wherein the first light or the second light is infrared light.

6. The detection device according to claim 2, wherein the first light or the second light is red light.

7. The detection device according to claim 1, wherein
   the first data and the second data are acquired in the detection area at different definitions from each other,
   one of the first data and the second data is acquired at a first definition,
   the other of the first data and the second data is acquired at a second definition different from the first definition, and the attribute information includes at least definition information indicating which of the first definition and the second definition is the definition used to acquire the first data.

8. The detection device according to claim 7, wherein the first definition or the second definition is 300 pixels per inch (ppi) or higher.

9. The detection device according to claim 7, wherein the first definition or the second definition is 50 pixels per inch (ppi) or lower.

10. The detection device according to claim 7, wherein the first definition or the second definition is higher than 50 pixels per inch (ppi) and lower than 300 ppi.

11. The detection device according to claim 1, wherein the first frame rate or the second frame rate is 20 frames per second (fps) or lower.

12. The detection device according to claim 1, wherein the first frame rate or the second frame rate is 100 frames per second (fps) or higher.

13. The detection device according to claim 1, wherein the first frame rate or the second frame rate is higher than 20 frames per second (fps) and lower than 100 fps.

14. The detection device according to claim 1, wherein third data is acquired in a first frame, and
fourth data is acquired in a second frame different from the first frame.

15. The detection device according to claim 1, wherein third data is acquired in odd-numbered frames, and
fourth data is acquired in even-numbered frames.

16. The detection device according to claim 1, wherein the detection area is divided into a first divided detection area and a second divided detection area,
third data is acquired in the first divided detection area, and
fourth data is acquired in the second divided detection area.

* * * * *